United States Patent
Parker et al.

(10) Patent No.: US 11,928,769 B2
(45) Date of Patent: Mar. 12, 2024

(54) EMPLOYING CONTROLLED ILLUMINATION FOR HYPERSPECTRAL OR MULTISPECTRAL IMAGING OF FOOD IN AN APPLIANCE

(71) Applicant: Samsung Electronics Company, Ltd., Gyeonggi-Do (KR)

(72) Inventors: Ian David Parker, Santa Barbara, CA (US); Brian R. Patton, San Francisco, CA (US); Pedro Martinez Lopez, Mountain View, CA (US); Sergio Perdices-Gonzalez, Sunnyvale, CA (US); Sajid Hassan Sadi, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 22 days.

(21) Appl. No.: 17/869,627

(22) Filed: Jul. 20, 2022

(65) Prior Publication Data

US 2024/0029337 A1  Jan. 25, 2024

(51) Int. Cl.
*G06T 15/04* (2011.01)
*G01J 3/10* (2006.01)
*G01J 3/28* (2006.01)

(52) U.S. Cl.
CPC ............ *G06T 15/04* (2013.01); *G01J 3/2823* (2013.01); *G01J 3/10* (2013.01); *G06T 2207/10036* (2013.01); *G06T 2207/30128* (2013.01)

(58) Field of Classification Search
None
See application file for complete search history.

(56) References Cited

U.S. PATENT DOCUMENTS

| | | |
|---|---|---|
| 10,853,758 B2 | 12/2020 | Schutt |
| 10,935,310 B2 | 3/2021 | Junge |
| 2018/0042483 A1 | 2/2018 | Bardhan |
| 2018/0239319 A1 | 8/2018 | Abdoo |

(Continued)

FOREIGN PATENT DOCUMENTS

WO    WO 2020-178052    9/2020

OTHER PUBLICATIONS

"Smart Oven: 12-1 Table Top Oven", by June Oven; https://juneoven.com/pages/smart-oven, 2021.

(Continued)

*Primary Examiner* — Frank S Chen

(57) ABSTRACT

In one embodiment, a method includes, by an electromagnetic device, emitting optical radiation on one or more objects disposed inside an interior of the electronic device, where the optical radiation is emitted by one or more radiation sources, capturing a set of 2D images of the one or more objects illuminated by the optical radiation, where variation of illumination or of an imaging process permits the set of 2D images to be combined into a representation of the one or more objects, determining whether the set of images comprises a representation of the one or more objects as imaged, in response to determining that the set of images comprises a representation of the one or more objects as imaged, generating a three-dimensional (3D) spectral data cube of the one or more first objects based on spectral information of the first set of images, and storing the 3D spectral data cube for processing by the electronic device.

20 Claims, 21 Drawing Sheets

(56) References Cited

U.S. PATENT DOCUMENTS

| | | |
|---|---|---|
| 2019/0200797 A1 | 7/2019 | Diao |
| 2020/0184624 A1 | 6/2020 | Jang |
| 2021/0089769 A1 | 3/2021 | Ryu |
| 2021/0096027 A1* | 4/2021 | Nunez Sanchez ........ G01J 3/12 |
| 2021/0174495 A1 | 6/2021 | Nipe |
| 2021/0228022 A1 | 7/2021 | Liu |
| 2022/0210347 A1 | 6/2022 | Noh |
| 2022/0252451 A1* | 8/2022 | Kim ....................... G01J 3/021 |

OTHER PUBLICATIONS

"Keep track of what's in your smart fridge with Family Hub", by Samsung; https://www.samsung.com/us/support/answer/ANS00049761/, 2022.

International Search Report and Written Opinion in International Application No. PCT/KR2023/007939, dated Sep. 15, 2023.

\* cited by examiner

EMPLOYING CONTROLLED ILLUMINATION FOR HYPERSPECTRAL OR MULTISPECTRAL IMAGING OF FOOD IN AN APPLIANCE

TECHNICAL FIELD

This disclosure relates generally to appliances, and more particularly to hyperspectral and multispectral imaging within kitchen appliances.

BACKGROUND

Smart kitchen appliances increasingly rely on computer vision (CV) to recognize foods to enhance user experiences. However, CV algorithms are computationally intensive, requiring expensive hardware (e.g., graphics processing units) to be integrated into the kitchen appliance. Further, foods represent a diverse category of potential images and misidentification of food is a common issue. Further, even when CV systems correctly identify foods, the algorithm may not assess food quality in the same way a human user would. It may be thus useful to provide techniques to improve kitchen appliance devices.

DESCRIPTION OF EXAMPLE EMBODIMENTS

Figure 1:
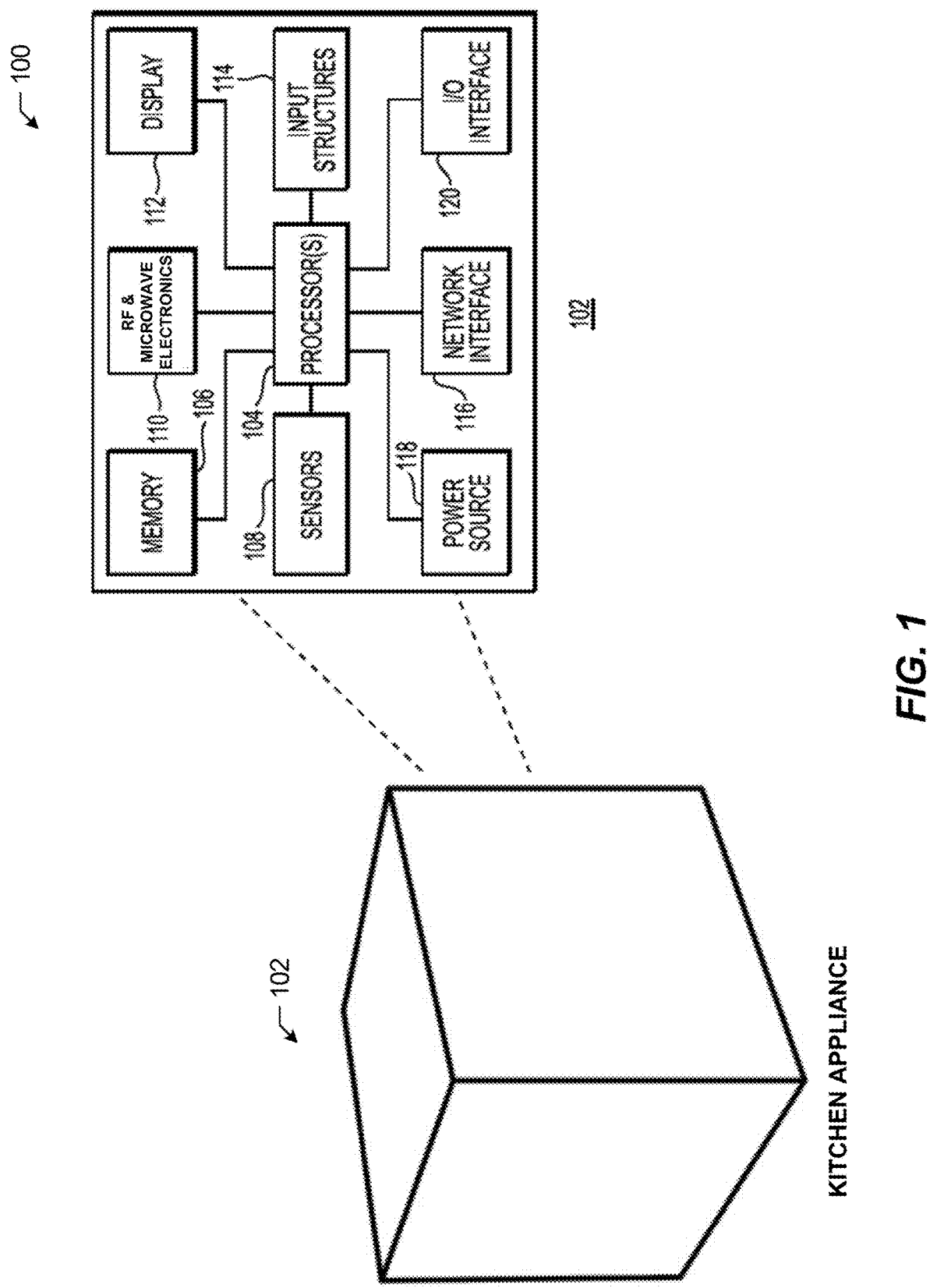
FIG. 1 illustrates an example diagram of a kitchen appliance.

FIG. 1 illustrates an example diagram 100 of a kitchen appliance 102. In particular embodiments, kitchen appliance 102 may include a microwave oven device or refrigeration device. As used herein, "interior" may be defined as an area in which food may cook or be refrigerated within a kitchen appliance 102. As an example and not by way of limitation, shelving storage areas within a refrigerator may be defined as an interior. As another example and not by way of limitation, the cooking chamber within a microwave oven may be defined as an interior. In particular embodiments, the kitchen appliance 102 may include, for example, any of various kitchen appliances 102 that may be suitable for heating, warming, cooling, or otherwise directing electromagnetic energy to one or more loads disposed inside the interior of the kitchen appliance 102. In particular embodiments, as further depicted by FIG. 1, the kitchen appliance 102 may include, among other things, one or more processor(s) 104, memory 106, sensors 108, radio frequency (RF) and microwave electronics 110, a display panel 112, input structures 114, network interfaces 116, a power source 118, and an input/output (I/O) interface 120. It should be noted that FIG. 1 is merely one example of a particular implementation and is intended to illustrate the types of components that may be included as part of the kitchen appliance 102.

In particular embodiments, the one or more processor(s) 104 may be operably coupled with the memory 106 to perform various algorithms for a kitchen appliance. Such programs or instructions executed by the processor(s) 104 may be stored in any suitable article of manufacture that includes one or more tangible, computer-readable media at least collectively storing the instructions or routines, such as the memory 106. The memory 106 may include any suitable articles of manufacture for storing data and executable instructions, such as random-access memory (RAM), read-only memory (ROM), rewritable flash memory, hard drives, and so forth. Also, programs (e.g., an operating system) encoded on such a computer program product may also include instructions that may be executed by the processor(s) 104 to enable the kitchen appliance 102 to provide various functionalities.

In particular embodiments, the sensors 108 may include, for example, one or more cameras (e.g., depth cameras), touch sensors, microphones, motion detection sensors, thermal detection sensors, light detection sensors, time of flight (ToF) sensors, ultrasonic sensors, infrared sensors, or other similar sensors that may be utilized to detect the physical state of the load (e.g., its temperature profile) or various user inputs (e.g., user voice inputs, user gesture inputs, user touch inputs, user instrument inputs, user motion inputs, and so forth). RF and microwave electronics 110 may include, for example, any number of magnetrons, power amplifiers, signal generators, waveguides, antennas, integrated circuits, transistors, solid-state amplifiers, and/or one or more other devices that may be collectively suitable for directing electromagnetic energy (e.g., microwave energy) to a load (e.g., food, solids, liquids, and so forth) that may be disposed inside the interior of the kitchen appliance 102. The display panel 112 may include any display architecture (e.g., AMLCD, AMOLED, micro-LED, and so forth), which may provide further means by which users may interact and engage with the kitchen appliance 102.

In particular embodiments, the input structures 114 may include any physical structures utilized to control one or more global functions of the kitchen appliance 102 (e.g., pressing a button to power "ON" or power "OFF" the kitchen appliance 102). The network interface 116 may include, for example, any number of network interfaces suitable for allowing the kitchen appliance 102 to access and receive data over one or more cloud-based networks (e.g., a cloud-based service that may service hundreds or thousands of the kitchen appliance 102 and the associated users corresponding thereto) and/or distributed networks. The power source 118 may include any suitable source of power, such as a rechargeable lithium polymer (Li-poly) battery and/or an alternating current (AC) power converter that may be utilized to power and/or charge the kitchen appliance 102 for operation. Similarly, the I/O interface 120 may be provided to allow the kitchen appliance 102 to interface with various other electronic or computing devices, such as one or more auxiliary electronic devices.

Certain technical challenges exist for imaging objects within kitchen appliance 102 in a way that allows for accurate identification of the object and/or an accurate quality assessment of the object. In general, illumination within consumer appliances are tailored around making objects inside the interior of the appliance look aesthetically pleasing to the user. For example, within a refrigerator, the illumination source may be tailored to create an aesthetic appearance of food to a user through the use of lights that maximize the color rendering index. While computer vision (CV) within kitchen appliance 102 may be employed to identify the food within the interior, due to a wide variety of possible foods, the CV system may incorrectly identify the food. Further, CV systems may be trained to assess the quality of each food within the interior of kitchen appliance 102. However, the illumination source within kitchen appliance 102 may not be suitable for the CV system to accurately conduct a quality assessment of the food. The solution presented by the embodiments disclosed herein to address this challenge may be hyperspectral imaging (HSI) and/or multispectral imaging (MSI) techniques for imaging a scene within an appliance (e.g., food within a refrigerator). Another technical challenge may be that the light source and sensors within kitchen appliance 102 are not suitable for performing HSI and/or MSI. The solution presented by the embodiments disclosed herein to address this challenge may be controlled illumination techniques within kitchen appliance 102 to permit HSI and/or MSI imaging of a scene.

Certain embodiments disclosed herein may provide one or more technical advantages. A technical advantage of the embodiments may include a hyperspectral and/or multispectral imaging system of kitchen appliance 102. Another technical advantage of the embodiments may include automatic food recognition through hyperspectral imaging (HSI) and/or multispectral imaging (MSI). Another technical advantage of the embodiments may include automated cooking through HSI-enabled and/or MSI-enabled monitoring of food doneness. A further technical advantage of the embodiments may include food quality monitoring through hyperspectral and/or multispectral imaging. Another technical advantage of the embodiments may include food cataloging and/or tracking by a kitchen appliance using HSI and/or MSI techniques. Certain embodiments disclosed herein may provide none, some, or all of the above technical advantages. One or more other technical advantages may be readily apparent to one skilled in the art in view of the figures, descriptions, and claims of the present disclosure.

As used herein, "hyperspectral imaging (HSI)" may refer to a technique for analyzing images at plurality of spectral bands, wherein the resulting images may display a large number of contiguous spectral bands. As used herein, "multispectral imaging (MSI)" may refer to a technique of capturing image data within specific wavelength ranges, wherein the resulting images provide discrete and discontinuous portions of the spectral range. It is understood that the range of illumination wavelengths may not be restricted to visible wavelengths and may include UV and infrared radiation (IR) wavelengths.

Figure 2A:
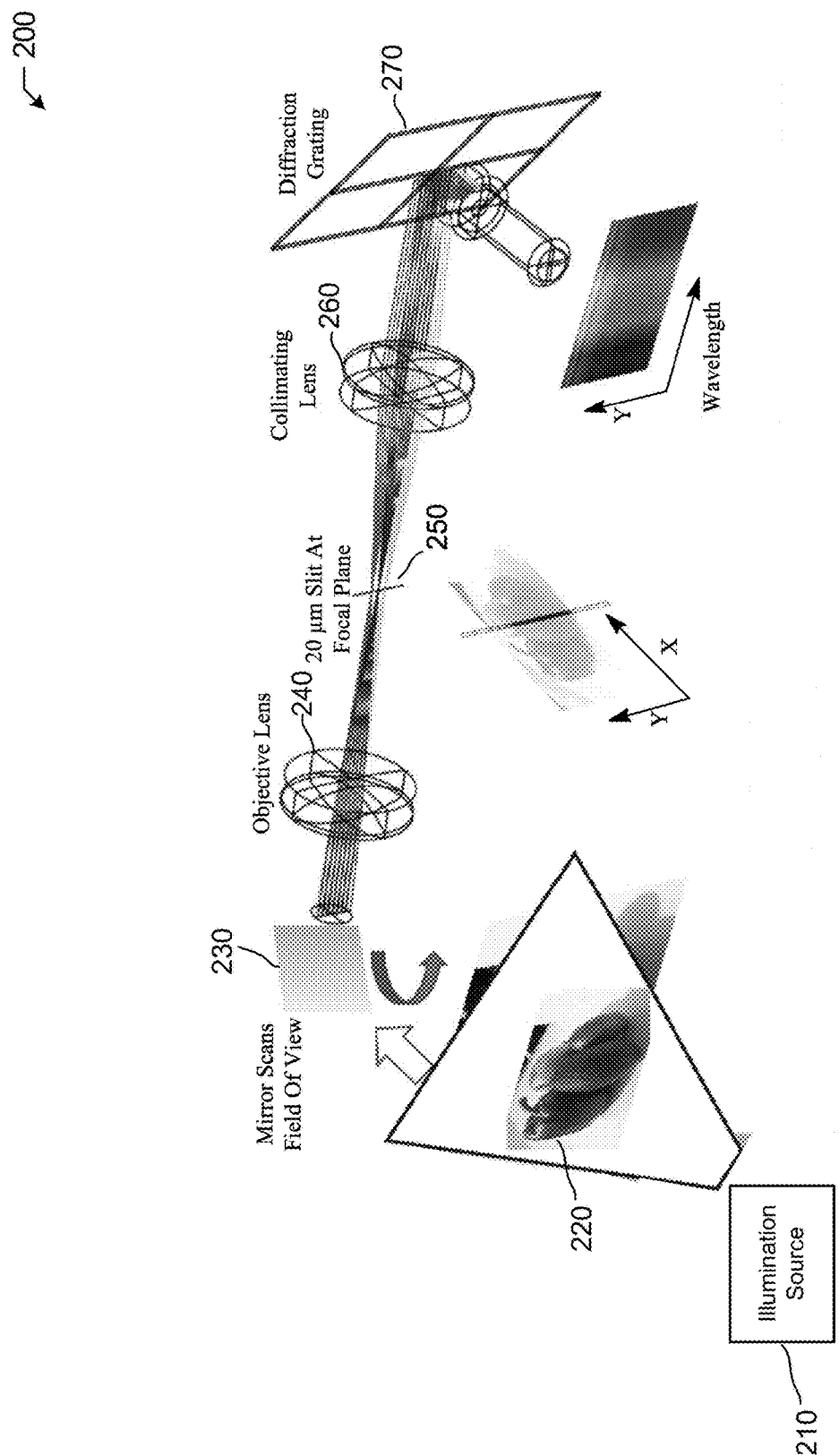
FIG. 2A illustrates an example diagram of a hyperspectral imaging system of a kitchen appliance.

FIG. 2A illustrates an example diagram 200 of a hyperspectral imaging system of kitchen appliance 102. In particular embodiments, kitchen appliance 102 may employ controlled illumination through illumination source 210 to facilitate imaging of objects within the interior of the appliance in such a way as to enable hyperspectral imaging (HSI) for object identification and/or quality assessment. In particular embodiments, kitchen appliance 102 may illuminate a scene (e.g., interior of kitchen appliance 102) with broadband light, wherein spectral discrimination may be performed upon detection. As used herein, "broadband light" may refer to light that is simultaneously emitting multiple wavelengths. Each object illuminated may have a spectrally varying reflectance. As an example and not by way of limitation, spectral discrimination of broadband light may be detected by one or more sensors (e.g., camera) by adding an optical band-pass filter and/or diffraction grating in front of the sensor for providing a line scan, as discussed further in FIG. 5.

In particular embodiments, kitchen appliance 102 may illuminate a scene with narrowband light at a specific wavelength. As used herein, "narrowband light" may refer to light at a specific wavelength of optical radiation. As an example and not by way of limitation, a sensor, such as a broadband camera, may capture an image before the wavelength is changed. In this example, sequential illumination with multiple narrowband light-emitting diodes (LEDs) may be captured with a monochrome camera, wherein the number of LEDs and the wavelengths emitted by the LEDs may be optimized for the particular application. As an example and not by way of limitation, a bank of LEDs emitting at a plurality of different discrete wavelengths may sequentially illuminate the interior of the kitchen appliance 102 when the appliance door is closed, and a broadband monochromatic camera may record images and reconstruct a hyperspectral data cube. As used herein, "data cube," may refer to a series of two-dimensional (2D) images taken at different wavelengths. In particular embodiments, each 2D image in a hyperspectral data cube may reveal the scenes intensity at a given wavelength. Within the 2D image, the reflectance $R_{ij}$ at the $ij^{th}$ pixel may be calculated as:

$$R_{ij} = R_{ij}(\lambda) = \frac{I_{ij}}{L_{ij}(\lambda)} \quad \text{(Equation 1)}$$

In Equation 1, $I_{ij}$ is is the intensity of the $ij^{th}$ pixel as captured by the camera in the 2D image and $L_{ij}(\lambda)$ is the scene illumination at that pixel's location at wavelength $\lambda$. It is important to control or at least know $L_{ij}$ at all wavelengths in order to extract meaningful reflectance data, which is possible by properly specifying the light source within the appliance.

In particular embodiments, one method for hyperspectral imaging (HSI) may be to illuminate the scene with a broadband light and then constrain the field of view to an approximately one-dimensional (1D) line across the scene. As an example and not by way of limitation, a dispersive or diffractive optic may be used to spread the line-image into corresponding spectral components, wherein different parts of the line-image correspond to different spectra according to the composition of the object being imaged. In this example, the result may be a 2D image captured by one or more sensors 108, wherein the Y-axis may represent image intensity variation in the Y dimension, and the X-axis may indicate intensity variation of each wavelength. As an example and not by way of limitation, the line-image may be scanned to select one or more different lines within the image, and the data from successive scans by the one or more sensors 108 may be combined into a three-dimensional (3D) hyperspectral data cube, as demonstrated in FIG. 2B. Although FIG. 2A demonstrates a particular order of optical elements, this disclosure contemplates any suitable approach for performing imaging.

In particular embodiments, illumination source 210 may illuminate one or more objects 220, wherein mirror 230 may scan a field of view. As an example and not by way of limitation, light may pass through one or more objective lenses 240 to focus the light onto slit 250, wherein slit 250 (e.g., 20 µm slit) may select a line from the reflected image. As an example and not by way of limitation, slit 250 may be used in place of or in addition to one or more cylindrical lens arrays or other suitable lens array. As another example and not by way of limitation, slit 250 may be moveable and/or adjustable to capture particular positions of objects 220. Further, slit 250 may be reflective to act as a mirror, or alternatively have absorbent properties to reduce background radiation and/or other background interference.

In particular embodiments, mirror 230 may be a rotating mirror, wherein a separate image may be reflected for each angle of rotation of mirror 230. Light reflected by mirror 230 may then pass through one or more collimating lens(es) 260 and be diffracted by diffraction grating 270, wherein the line from the reflected image may be spread into each component wavelength for capture by processor 104 of one or more sensors 108 of kitchen appliance 102. As an example and not by way of limitation, the one or more sensor(s) 108 may include a monochrome camera with high sensitivity. In particular embodiments, multiple images may be generated by rotating mirror 230, wherein each image captured by processor 104 of the one or more sensors 108 of kitchen appliance 102 may be stored in memory 106 of kitchen appliance 102, and the compilation of stored images may be used to generate a three-dimensional (3D) data cube 290.

Figure 2B:
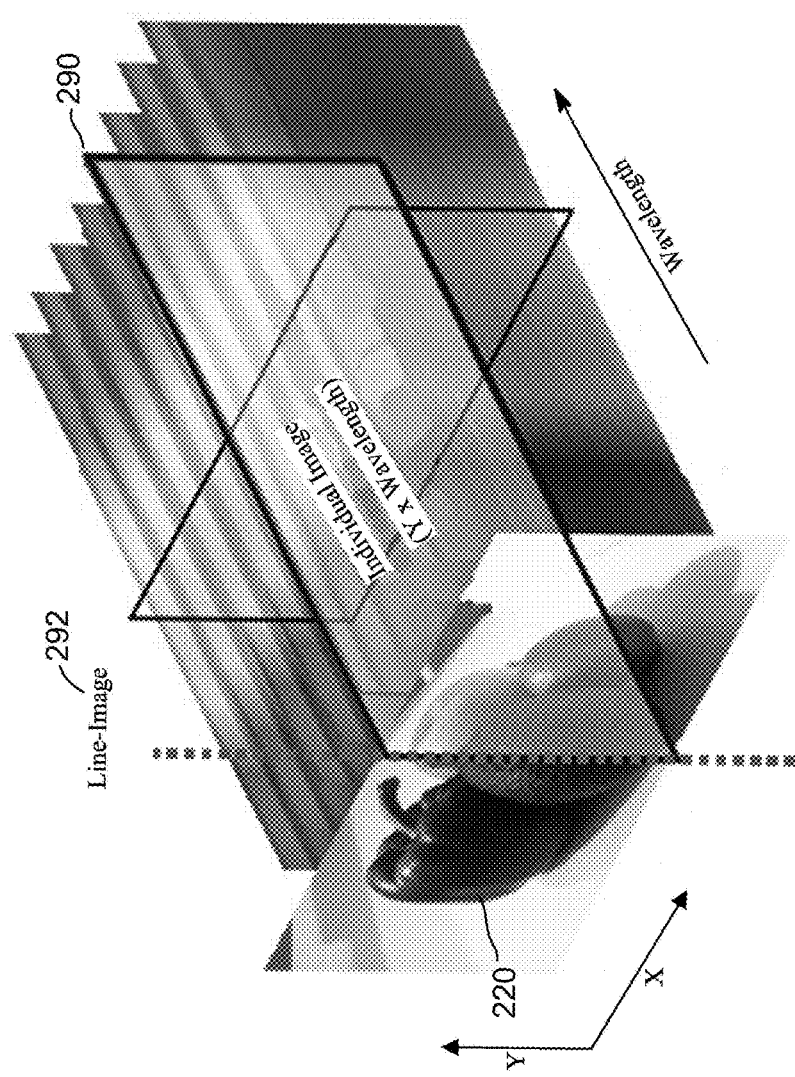
FIG. 2B illustrates an example diagram of a three-dimensional data cube.

FIG. 2B illustrates an example diagram 280 of a three-dimensional data cube 290. Three-dimensional data cube 290 as represented in diagram 280 is a line-scan data cube, wherein the line-scan data cube is accumulated by compiling a plurality of (Y, wavelength) images at different X-values, where X, Y are spatial coordinates. In particular embodiments, illumination source 210 may illuminate objects 220, wherein the hyperspectral imaging system of kitchen appliance 102 may be optically arranged so that one vertical slice of an image is presented to the hyperspectral imaging system at a time. As the vertical slice (e.g., line image 292) is captured, the slice may be passed through diffraction grating 270, which acts to spread the captured light into spectral components, resulting in a two-dimensional image. In particular embodiments, to generate 3D data cube 290, the hyperspectral imaging system may optically scan (e.g., from left to right) objects 220, collecting a plurality of two-dimensional images. 3D data cube 290 may then be accumulated by compiling the plurality of vertical slices (e.g., line scan images) into three dimensions, generating 3D data cube 290.

In particular embodiments, spectral and/or spatial information may be extracted by slicing the 3D data cube 290 in one or more directions. As an example and not by way of limitation, 3D data cube 290 may be collected in approximately three seconds and is typically 640×480×600 pixels (e.g., a file size of approximately 100 MB). In particular embodiments, 3D data cube 290 may be formed by combining a set of monochromatic or nearly monochromatic images taken at a set of wavelengths that provide useful spectral information about object 220. In this example, each image in 3D data cube 290 may be acquired by using a different distinct wavelength. Further, in this example the imaging sensor (e.g., camera) must have sensitivity corresponding to the wavelengths emitted by the LED source. In particular embodiments, illumination source 210 may be used in combination with a series of monochromatic or nearly monochromatic filters. In this example, each image in 3D data cube 290 may be acquired by using a different filter and the imaging sensor must have a sensitivity to the wavelengths of each of the plurality of filters. As an example and not by way of limitation, the HSI system of kitchen appliance 102 may scan wavelengths in the Y dimension, thereby allowing the system to generate 3D data cube 290 by compiling the captured spectral information over time to increase resolution in the Y dimension.

Figure 3A:
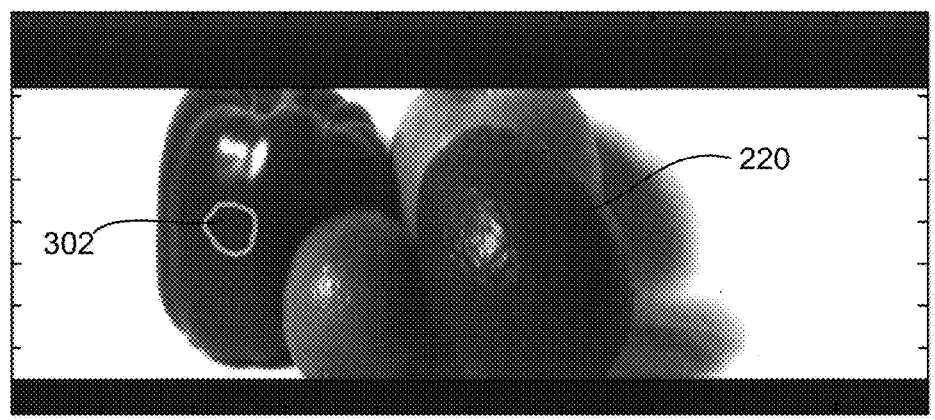
FIG. 3A illustrates an example diagram of objects measured by the technique of hyperspectral imaging using a high color rendering index (CRI), white LED with broadband emission as the illumination source.
Figure 3A:
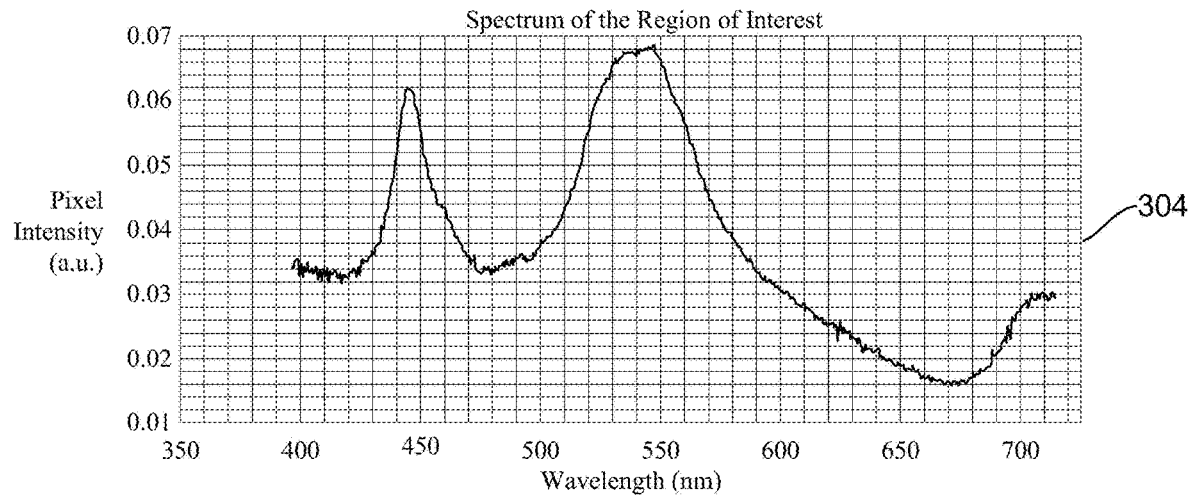
Figure 3A:
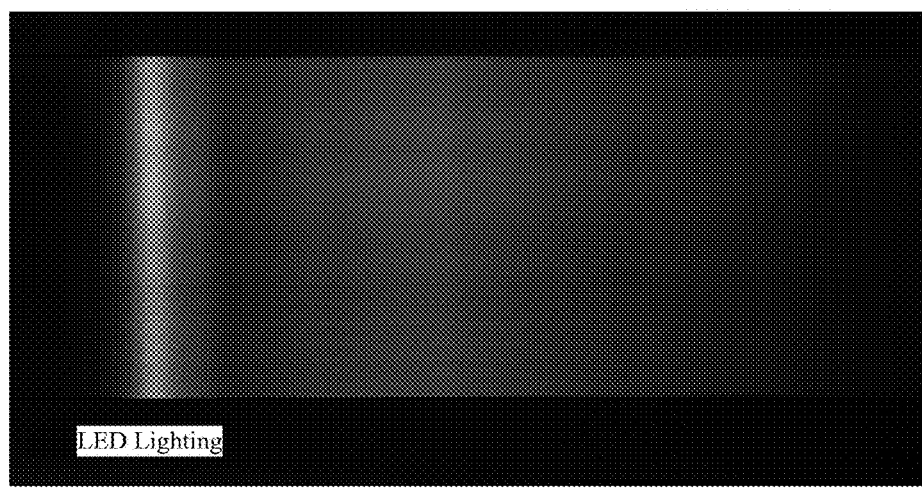

FIG. 3A illustrates an example diagram 300 of objects 220 measured by the technique of hyperspectral imaging using a high color rendering index (CRI), white LED with broadband emission as the illumination source 210. As discussed previously, measuring the reflectance profile of a food at a plurality of different wavelengths may help identify food by distinguishing it from other foods with a similar appearance. Knowledge and/or control of the illumination source (e.g., LED lighting, sunlight, fluorescent lighting) and corresponding illumination spectrum is key to performing hyperspectral imaging, as the measured spectrum may vary considerably as a result of different illumination conditions. As demonstrated in FIG. 3A, the region of interest 302 (in this case a section of a green bell pepper) of objects 220 may be imaged as a result of illumination by illumination source 210. In the example of FIG. 3A, illumination source 210 may be a high CRI, white LED with broadband emission. As an example and not by way of limitation, the LED light emitted by illumination source 210 as reflected by the region of interest 302 may be captured by one or more sensors 108 of kitchen appliance 102. As a result, graph 304 may be generated corresponding to the spectrum of the region of interest 302. As an example and not by way of limitation, the x-axis of graph 304 of the spectrum of the region of interest 302 may represent pixel intensity (A.U.) as a function of wavelength.

Figure 3B:
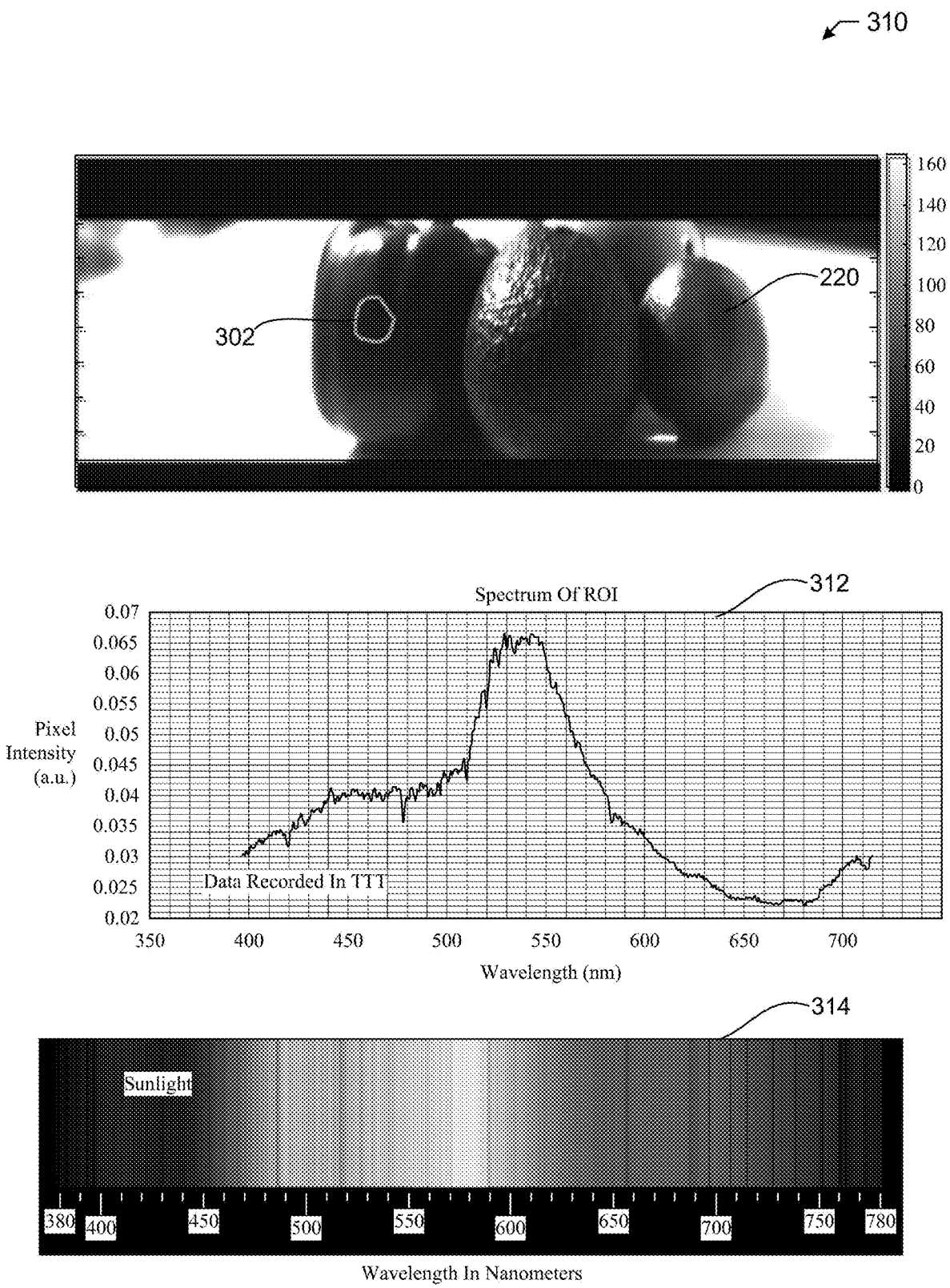
FIG. 3B illustrates an example diagram of objects measured by the technique of hyperspectral imaging with a sunlight illumination source.

FIG. 3B illustrates an example diagram 310 of objects 220 measured by the technique of hyperspectral imaging with a sunlight illumination source. As demonstrated in diagram 310, the region of interest 302 of objects 220 may be illuminated by sunlight, wherein the reflectance of light off of the region of interest 302 may be captured by one or more sensors 108 of kitchen appliance 102. As a result, graph 312 may be generated to represent pixel intensity (A.U.) as function of wavelength for the region of interest 302.

Figure 3C:
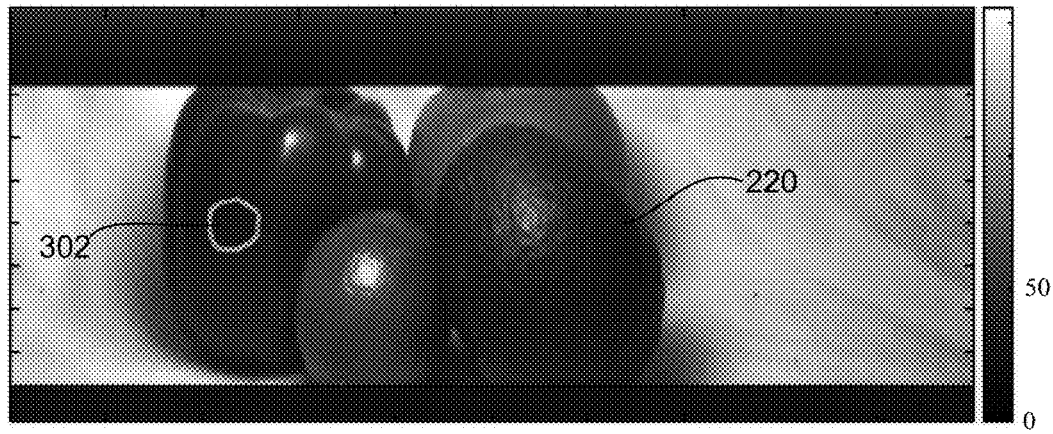
FIG. 3C illustrates example diagram of objects measured by the technique of hyperspectral imaging with a fluorescent illumination source.
Figure 3C:
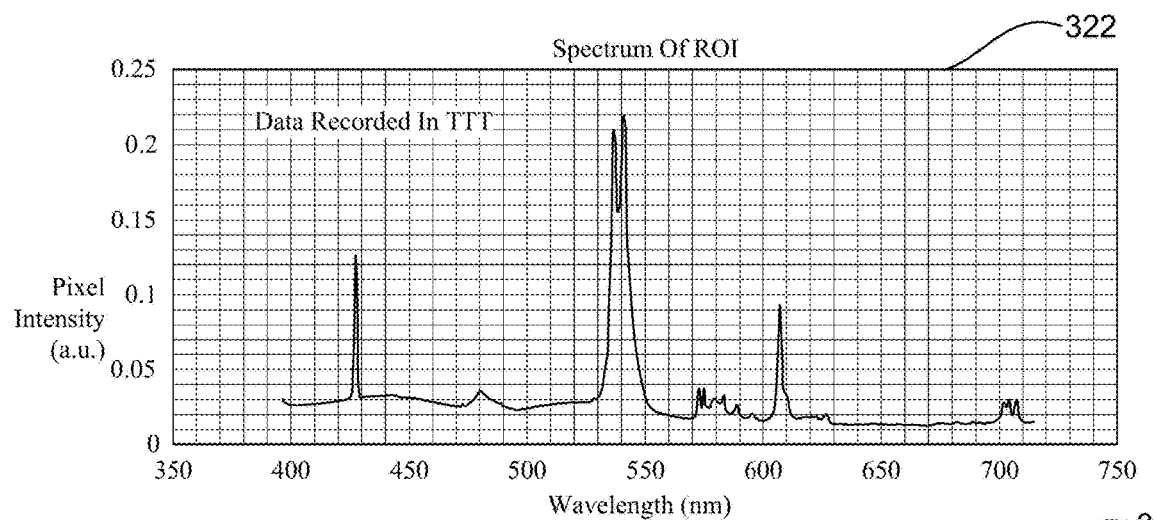
Figure 3C:
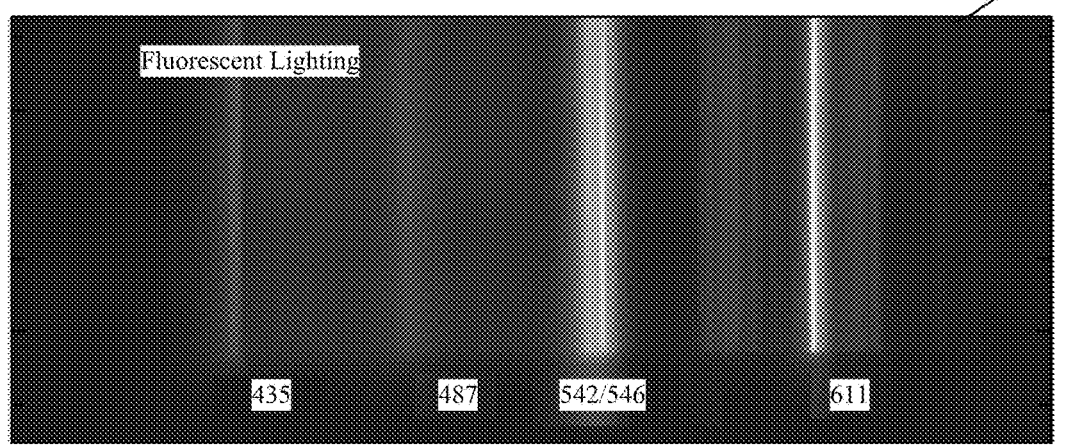

FIG. 3C illustrates an example diagram 320 of objects 220 measured by the technique of hyperspectral imaging with a fluorescent illumination source. As demonstrated by diagram 320, the region of interest 302 of objects 220 may be imaged by a fluorescent illumination source, wherein the reflectance of light off of the region of interest 302 may be captured by one or more sensors 108 of kitchen appliance 102. As a result, graph 322 may be generated to represent pixel intensity (A.U.) as a function of wavelength for the region of interest 302.

While the data demonstrated in FIGS. 3A-3C was recorded in the visible spectrum (400-700 nm), valuable information about classification of each object 220 may be obtained by performing HSI or MSI at wavelengths extending into the ultraviolet (<400 nm) and near-infrared (700-2000 nm) spectrum. As an example and not by way of limitation, the illumination sources and sensors 108 may be tailored to wavelength ranges of interest depending on the type of kitchen appliance 102 and corresponding applications (e.g., in a refrigerator the application of interest may be identifying foods within the interior whereas in a microwave oven the application of interest may be identifying areas of the food that are cooked/uncooked). It is understood that the wavelength ranges used to create the 3D data cube 290 may be broadband and continuous or multispectral images captured for a sparse set of discrete and non-adjacent wavelengths that provide adequate spectral discrimination for the application of interest. Full broadband HSI over a continuous wavelength range naturally provides more data than MSI performed at discrete wavelengths, however, MSI may be particularly suited to kitchen appliances 102 due to a decreased complexity of implementation as compared to HSI.

Figure 4:
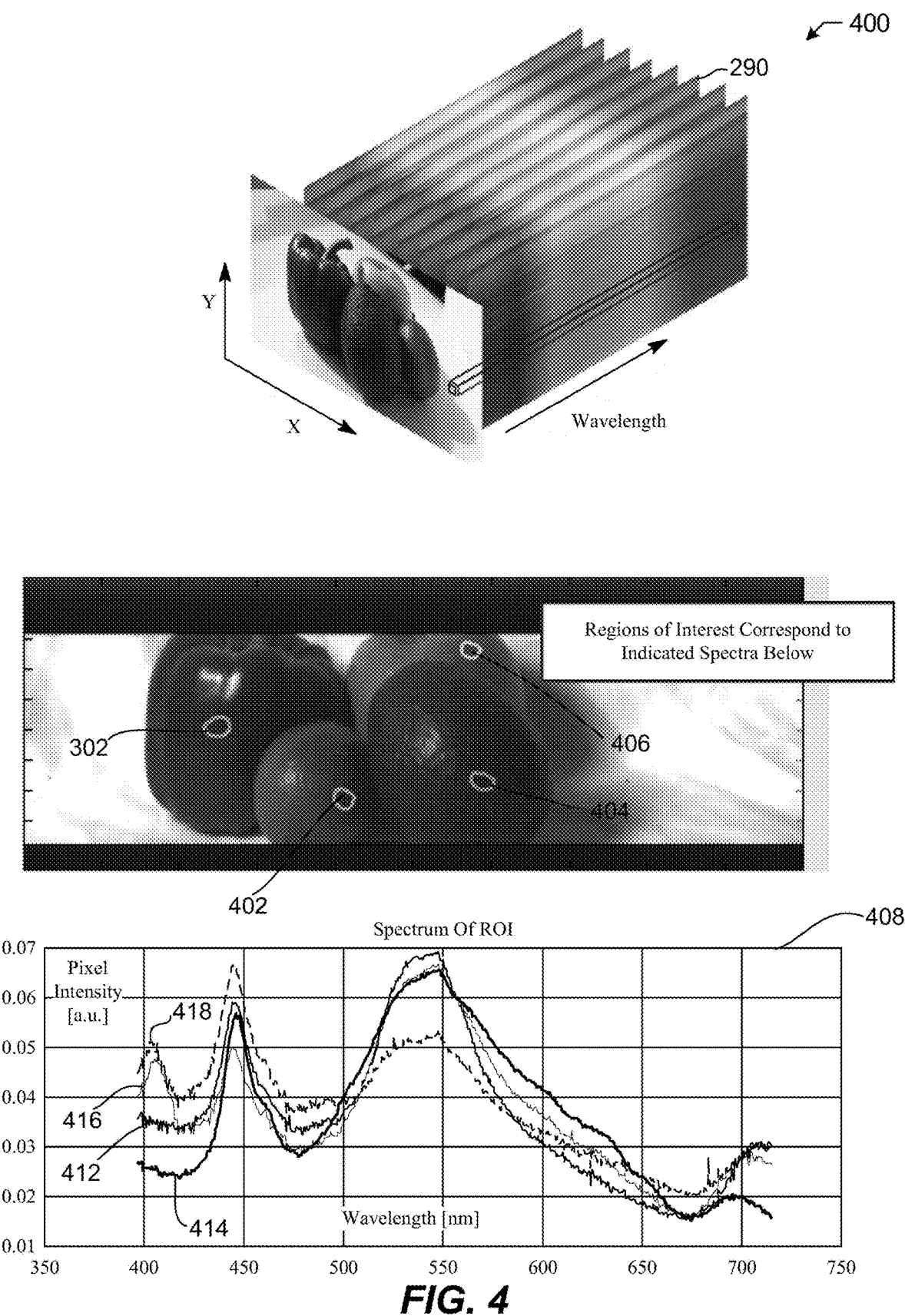
FIG. 4 illustrates an example diagram of automatic food recognition by a kitchen appliance through hyperspectral imaging.

FIG. 4 illustrates an example diagram 400 of automatic food recognition by a kitchen appliance 102 through hyperspectral imaging. In particular embodiments, the hyperspectral imaging system of kitchen appliance 102 may identify one or more regions of interest 302, 402, 404, and 406 corresponding to each respective object 220 being imaged. As an example and not by way of limitation, one or more processors 104 of kitchen appliance 102 may identify the regions of interest 302, 402, 404, and 406 as satisfying one or more criterion. For example, regions of interest 302, 402, 404, and 406 may be points on each respective object 220 that reflect the most illumination from illumination source 210. In particular embodiments, one or more images recorded by one or more sensors 108 of kitchen appliance 102 for each region of interest 302, 402, 404, and 406 of objects 220 may be compiled into a 3D data cube 290. As an example and not by way of limitation, the spectrum at each pixel in the one or more images of regions of interest 302, 402, 404, and 406 may be extracted and displayed in graph 408. In the example of graph 408, each region of interest (e.g., 302, 402, 404, and 406) may generate a corresponding region of interest, wherein pixel intensity (a.u.) may be mapped on the y-axis and wavelength (nm) may be mapped on the x-axis of graph 408. For example, as displayed by graph 408, line 412 corresponds to the spectrum of each pixel of region of interest 302, line 414 corresponds to the spectrum of each pixel of region of interest 406, line 416 corresponds to the spectrum of each pixel of region of interest 402, and line 418 corresponds to the spectrum of each pixel of region of interest 404.

In particular embodiments, the hyperspectral imaging system of kitchen appliance 102 may compare the graph 408 of the spectrum of each region of interest 302, 402, 404, and 406 to one or more databases of reference spectra for object 220 identification. As an example and not by way of limitation, kitchen appliance 102 may retrieve previously recorded reference spectra of a plurality of objects 220 (e.g., foods) from memory 106 of kitchen appliance 102. As another example and not by way of limitation, kitchen appliance 102 may retrieve previously recorded reference spectra of the plurality of objects via network interface 116, wherein the reference spectra may be stored in one or more external datastores, databases, and/or other suitable storage method. In particular embodiments, one or more processors 104 of kitchen appliance 102 may instruct one or more algorithms of the hyperspectral imaging system to compare the measured spectrum of regions of interest against the database of reference spectra, wherein matches above a specified threshold may be sorted, weighed, and/or displayed to a user via the user interface of kitchen appliance 102.

Figure 5:
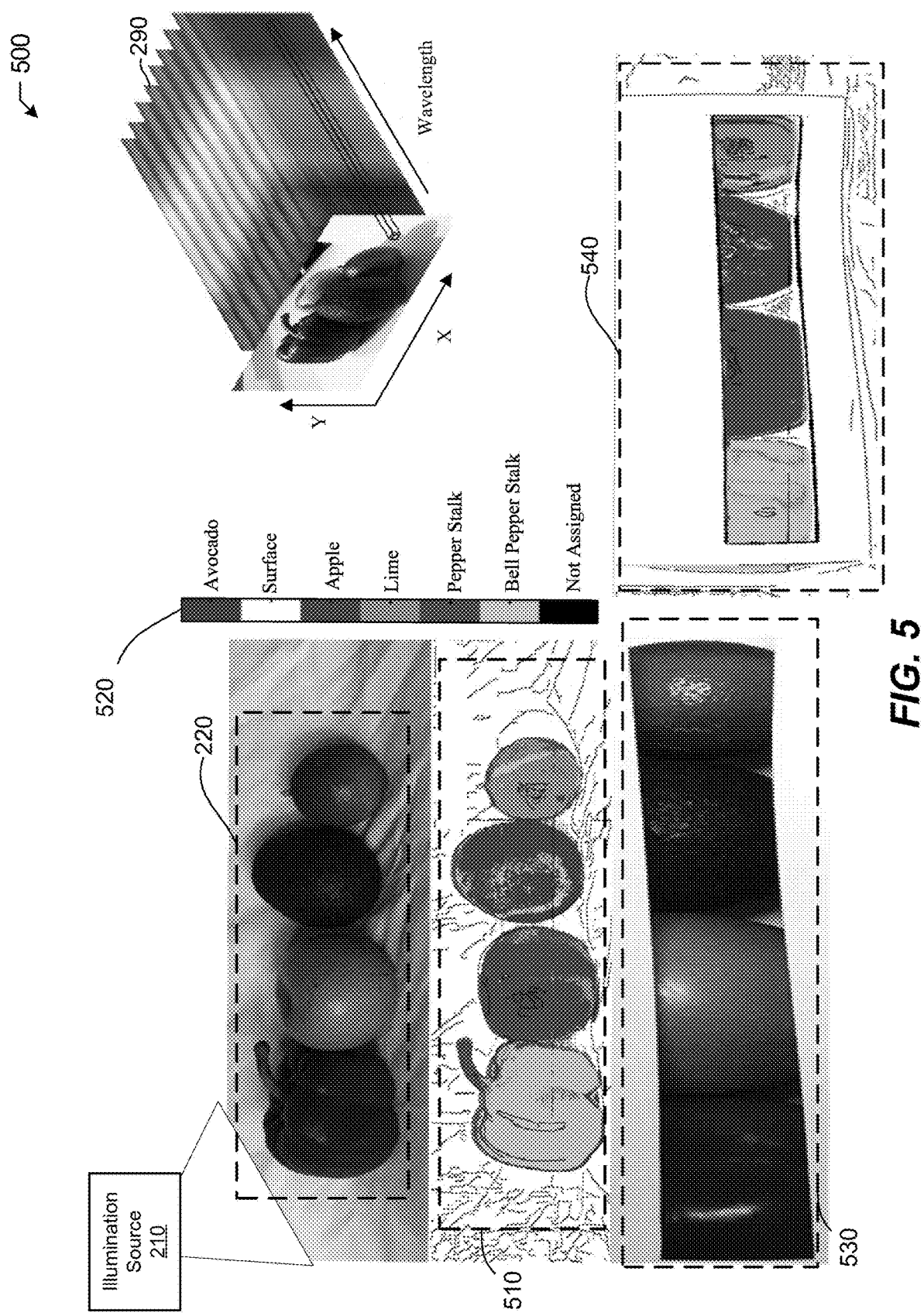
FIG. 5 illustrates an example diagram of automatic classification of food by a kitchen appliance through hyperspectral and/or multispectral imaging.

FIG. 5 illustrates an example diagram 500 of automatic classification of food by a kitchen appliance 102 through hyperspectral and/or multispectral imaging. In particular embodiments, one or more processors 104 of kitchen appliance 102 may instruct the imaging system of kitchen appliance 102 to perform automatic classification of one or more objects 220 by using pattern-matching algorithms (comparing measured spectra to those in a database), or through machine-learning-based computer vision techniques. As demonstrated by diagram 500, an illumination source 210 may be located within the interior of kitchen appliance 102. As an example and not by way of limitation, illumination source 210 may emit broadband and/or narrowband illumination. As another example and not by way of limitation, illumination source 210 may be emitted by one or more arrays of LEDs, wherein the one or more arrays of LEDs emit a plurality of different discrete wavelengths.

In particular embodiments, one or more processors 104 of kitchen appliance 102 may instruct the illumination source 210 located within the interior of the kitchen appliance 102 to direct illumination on one or more objects 220. As an example and not by way of limitation, one or more sensors 108 of kitchen appliance 102 may capture a two-dimensional image 510 of objects 220 illuminated by illumination source 210. As an example and not by way of limitation, sensors 108 may include a monochromatic camera, and/or other suitable sensor 108. As another example and not by way of limitation, kitchen appliance 102 may capture a two-dimensional image 510 of objects 220 with one or more computer vision techniques.

In particular embodiments, the hyperspectral and/or multispectral imaging system of kitchen appliance 102 may compile a plurality of images taken by one or more sensors 108 of kitchen appliance 102 into three-dimensional data cube 290. As an example and not by way of limitation, one or more processors 104 of kitchen appliance 102 may instruct the imaging system to extract spatial and/or spectral information through slicing the 3D data cube 290 in one or more directions. In particular embodiments, after extracting spatial and/or spectral information from 3D data cube 290, kitchen appliance 102 may retrieve one or more spectral data sets in which two-dimensional image 510 may be spectrally compared to the spectral scale 520 of the previously stored data sets. As demonstrated by spectral scale 520, different colors and/or shades may correspond to individual objects 220. As an example and not by way of limitation, the hyperspectral and/or multispectral imaging system of kitchen appliance 102 may compare two-dimensional image 510 with the spectral scale 520 of one or more data sets stored locally on memory 108 of kitchen appliance 102 and/or stored externally in one or more external locations (e.g., separate server, cloud database) to generate an identification of objects 220. For example, as demonstrated in diagram 500, objects 220 may include a bell pepper, apple, avocado, and lime. Kitchen appliance 102 may then image the objects 220 through the techniques of hyperspectral imaging, multispectral imaging, and/or computer vision, either alone or in combination. As an example and not by way of limitation, one or more two dimensional images 510 may be taken, wherein the images may be compiled into the three-dimensional data cube 290. As another example and not by way of limitation, kitchen appliance 102 may extract spectral information from the 3D data cube 290 and match the spectral information with a database of previously stored spectral information corresponding to particular objects. For example, the spectral information may match the objects to their respective food types (e.g., bell pepper, apple, avocado, and lime).

In particular embodiments, kitchen appliance 102 may instruct one or more processors 104 to store each image containing spectrum information locally in memory 106 of kitchen appliance 102, wherein each image may further train one or more machine-learning based algorithms for identification and/or classification of objects 220. As another example and not by way of limitation, kitchen appliance 102 may instruct one or more processors 104 to store each image containing spectrum information externally in one or more external datastores, databases, and/or other suitable storage location. As an example and not by way of limitation, the database containing spectral information about a plurality of objects 220 (e.g., food items) may be continuously updated by kitchen appliance 102. In particular embodiments, one or more algorithms may be used to classify a plurality of objects 220 from a calibrated measurement of the objects spectrum as compared to the stored spectral information for a variety of objects. It is understood that the database may contain several different spectra corresponding to objects 220 to account for naturally occurring color differences (e.g., apples of different color). As an example and not by way of limitation, one or more algorithms such as least-squares fitting, principal component analysis, support vector machines (SVM), and/or neural network systems may be applied to the database of spectrum information. As another example and not by way of limitation, kitchen appliance 102 may instruct one or more processors 104 to perform one or more Computer-vision segmentation algorithms to assist with object identification.

In particular embodiments, objects 220 disposed inside the interior of kitchen appliance 102 may be contained inside packaging (e.g., a cake inside a cardboard box). For example, image 530 demonstrates foods (e.g., objects 220) located within packaging, wherein only a section of the surface of each food is visible to one or more sensors 108 of the hyperspectral imaging system. In particular embodiments, kitchen appliance 102 may use a machine-learning based computer vision technique to scan barcodes of packaging for object 220 identification. In particular embodiments, kitchen appliance 102 may utilize computer vision to generate a two-dimensional image 540 of the objects 220 within a packaging. As an example and not by way of limitation, kitchen appliance 102 may utilize both computer vision and hyperspectral and/or multispectral imaging to image objects 220. In this example, the hyperspectral and/or multispectral imaging system of kitchen appliance 102 may recognize foods by their spectral signature of a small region of interest, even if their total shape is occluded or obscured within the field of view of one or more sensors 108 (e.g., monochrome camera).

In particular embodiments, kitchen appliance 102 may instruct one or more processors 104 to execute instructions for automated cooking through hyperspectral and/or multispectral imaging-enabled monitoring of one or more objects 220. Temperature is one metric used for assessing objects 220 (e.g., food) during the cooking process. However, in many instances, such as baking or broiling, the doneness of food may be judged by changes in the food's visible color. In particular embodiments, kitchen appliance 102 may utilize HSI/MSI to provide additional information about the state of an object 220 during the cooking process, beyond what is obtained by a standard RGB camera. As an example and not by way of limitation, kitchen appliance 102 may utilize information obtained by HSI/MSI to predict the doneness of food being cooked, and further instructing kitchen appliance 102 to suspend the emission of radiation and/or heat into the cavity of the kitchen appliance 102 once the food is determined to be done cooking and preventing over-cooking.

In particular embodiments, kitchen appliance 102 may instruct one or more processors 104 to execute instructions to perform food quality monitoring through hyperspectral and/or multispectral imaging. In particular embodiments, controller 650 may instruct the imaging system of the electronic device (e.g., kitchen appliance 102) to capture subsequent sets of images of objects 220 over some period of time. As an example and not by way of limitation, kitchen appliance 102 may capture a second set of images of the objects 220, wherein the second set of images may be compared to the first set of images to determine a change in quality (e.g., food quality degradation). As an example and not by way of limitation, HSI/MSI may be used to identify adulterants in ingredients, assess fecal and/or bacterial contamination of foods (e.g., meats and produce), identify the presence of bone fragments in meat, identify defects (e.g., bruises) in produce, and quantify the ripeness of fruit. In general, identification of specific quality-correlated chemical signatures unique to particular foods may require large data sets, pre-calibration of the HSI/MSI apparatus, or intensive computation. Nonetheless, qualitative indicators of food quality change may be derived if the same food item is repeatedly imaged by HSI over a period of time. For example, a food storage kitchen appliance 102 (e.g., refrigerator) may instruct one or more processors 104 to conduct a longitudinal study of the same foodstuffs, offering the potential to track food quality over time and notify users of changes that may indicate spoilage. As an example and not by way of limitation, for particular categories of foods (e.g., unripe fruit), kitchen appliance 102 may utilize HSI/MSI to indicate an improvement in quality over time as the fruit ripens.

In particular embodiments, kitchen appliance 102 may instruct one or more processors 104 to perform food cataloging and/or tracking through the technique of HSI and/or MSI. In the case of a food-storage kitchen appliance 102 (e.g., refrigerator), the hyperspectral and/or multispectral imaging system may perform automatic recognition of food and allow for robust automatic inventory tracking with little to no user input required. Although some prepackaged food may be readily identified by their packaging via computer vision using RGB images, the addition of spectral data may extend the amount of information that may be gathered from each object 220 inside the cavity of kitchen appliance 102, resulting in a reduced error rate of identification of each object 220. As an example and not by way of limitation, kitchen appliance 102 utilizing HSI and/or MSI to identify one or more objects 220 disposed inside the interior may, in conjunction with other measurements (e.g., food weight as indicated by a strain gauge), track object type and quantity for the user, resulting in providing nutritional information to the user about what the user has cooked.

Figure 6:
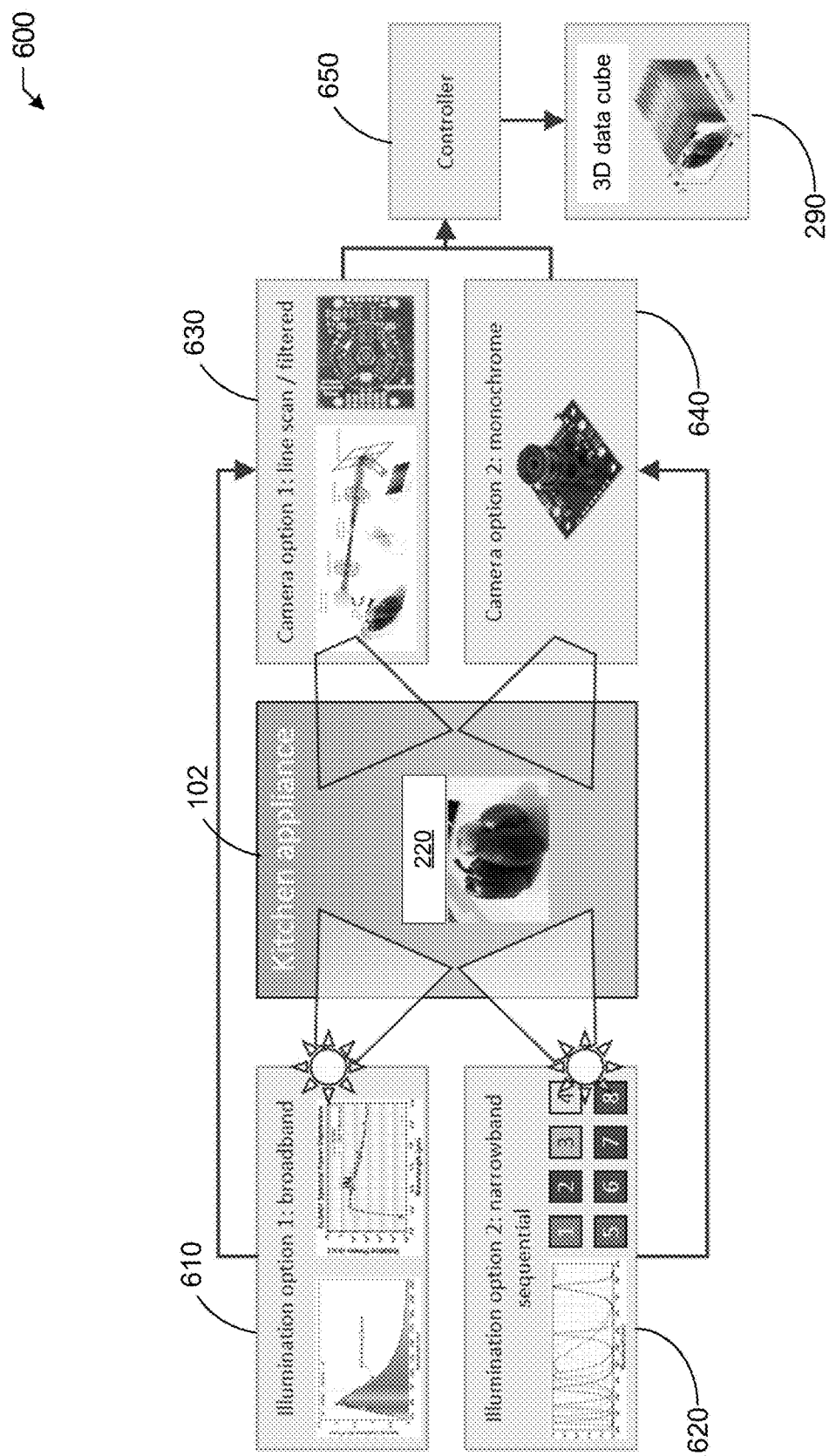
FIG. 6 illustrates an example workflow diagram depicting a technique for implementing hyperspectral and/or multispectral imaging in a kitchen appliance.

FIG. 6 illustrates an example workflow diagram 600 depicting a technique for implementing hyperspectral and/or multispectral imaging in a kitchen appliance 102. In particular embodiments, the workflow may begin at step 610, wherein kitchen appliance 102 may instruct a continuous broadband illumination source to illuminate the interior of kitchen appliance 102. It is understood that the broadband illumination source may emit a spectrum spanning the wavelength range required for performing hyperspectral imaging of food for the applications of food recognition and/or quality assessment, which may include ultraviolet or infrared wavelength ranges. In particular embodiments, the workflow may begin at step 620, wherein kitchen appliance 102 may instruct a narrowband illumination source to illuminate the interior of kitchen appliance 102. It is understood that the narrowband illumination source may emit a spectrum spanning the wavelength range required for performing multispectral imaging of food for the applications of food recognition and/or quality assessment, which may include ultraviolet or infrared wavelength ranges. Although this disclosure discusses two particular illumination options (e.g., broadband illumination in step 610 and narrowband illumination in step 620), this disclosure contemplates any suitable illumination source 210. As an example and not by way of limitation, illumination source 210 may include continuous broadband, multi-band, and/or a sequentially switched array of multiple finite-band light sources.

In particular embodiments, optical radiation may be emitted by a broadband radiation source disposed inside the interior of kitchen appliance 102, wherein each 2D image in a set of 2D images may represent a linear cross-section within the field of view of an imaging device, and wherein the second dimension of each 2D image may depict a variation of the linear-cross section across multiple wavelengths. As an example and not by way of limitation, an imaging process may be varied to select particular linear cross-sections within a field of view of the imaging device.

In particular embodiments, optical radiation may be emitted by one or more sources among a set of narrowband illumination sources disposed inside the interior of kitchen appliance 102, wherein each 2D image in the set of 2D images may be a 2D spatial view of the one or more objects imaged at a wavelength range corresponding to the optical radiation and wherein the optical radiation is varied to select particular wavelength ranges for sequential 2D images.

In particular embodiments, kitchen appliance 102 may contain one or more optical sensors suitable for capturing hyperspectral and/or multispectral data. In response to illumination by a broadband light source, as in step 610, the workflow may continue at step 630, wherein a monochrome camera may capture an image, and wherein a line in the image at a particular spatial position (e.g., X) may be selected. In this example, spectral information may be extracted using a diffraction grating and a monochromatic camera to generate a singular slice of the image along the transverse dimension (e.g., Y×λ). In particular embodiments, in response to illumination by a narrowband light source, as in step 620, the workflow may continue at step 640, wherein a monochromatic camera of kitchen appliance 102 may capture two-dimensional images of the interior of kitchen appliance 102 (e.g., X×Y) at a plurality of different wavelengths. In particular embodiments, kitchen appliance 102 may instruct one or more controllers 650 to combine the individual two-dimensional images from either of steps 630 or 640 into a 3D data cube 290.

Figure 7:
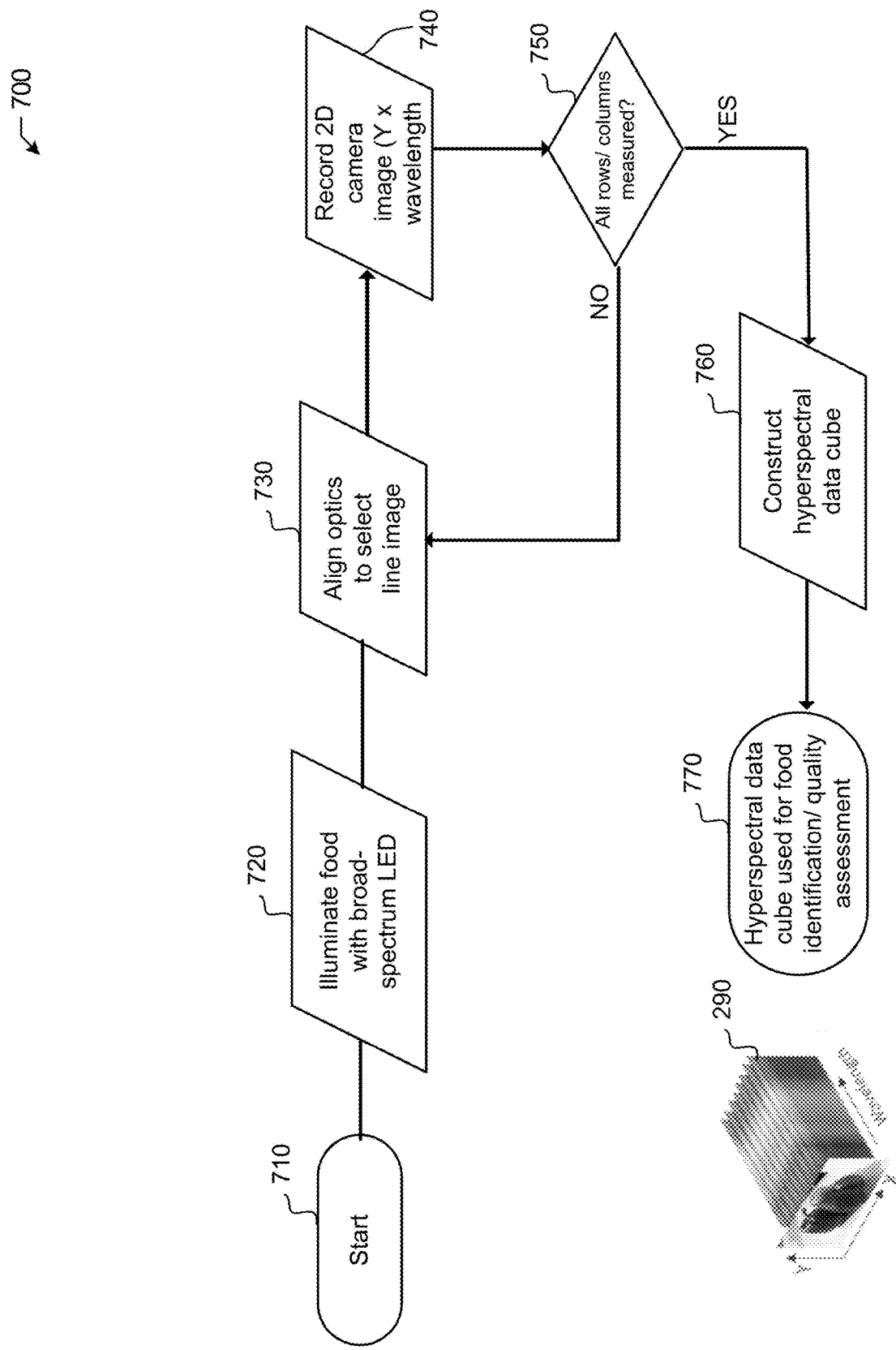
FIG. 7 illustrates an example workflow diagram depicting a technique for implementing hyperspectral imaging for a kitchen appliance.

FIG. 7 illustrates an example workflow diagram 700 depicting a technique for implementing hyperspectral imaging for a kitchen appliance 102. In particular embodiments, diagram 700 may begin at block 710, wherein one or more processors 104 of kitchen appliance 102 may instruct a hyperspectral imaging system of kitchen appliance 102 to illuminate food (e.g., objects 220) with broad-spectrum LED light, as in block 720. As an example and not by way of limitation, kitchen appliance 102 may contain one or more broad-spectrum LEDs located in a plurality of positions within the interior of kitchen appliance 102.

At block 730, one or more controller(s) 650 may to send instructions to the hyperspectral imaging system of kitchen appliance 102 to align optics to select a line image 292. As an example and not by way of limitation, the one or more controllers 650 of kitchen appliance 102 may generate instructions for the hyperspectral imaging system of kitchen appliance 102 to align one or more components of the optical system (e.g., mirror 230, one or more objective lenses 240, slit 250, one or more collimating lenses 260, diffraction grating 270) with one or more sensors 108 of kitchen appliance 102 to generate a line image 292. In particular embodiments, at block 740, kitchen appliance 102 may instruct one or more controllers 650 to record one or more two-dimensional images via the one or more sensors 108 inside the interior of kitchen device 102. As an example and not by way of limitation, kitchen appliance 102 may record images in the Y-dimension as a function of wavelength. As another example and not by way of limitation, the hyperspectral imaging system of kitchen appliance 102 may be optically arranged so that one two-dimensional line image 292 in the Y-dimension may be recorded by the hyperspectral imaging system at a time, as the hyperspectral imaging system images object 220.

At block 750, kitchen appliance 102 may evaluate the plurality of two-dimensional line images 292 to determine that all rows and/or columns have been measured by one or more sensors 108 of kitchen appliance 102. In response to kitchen appliance 102 determining that all rows and/or columns have been measured by the one or more sensors 108, controller 650 may instruct one or more processors 104 of kitchen appliance 102 to construct a 3D data cube 290, as in block 760. In particular embodiments, kitchen appliance 102 may determine that all rows and/or columns have not been measured by one or more sensors 108 of kitchen appliance 102, in which case controller 650 may send instructions to kitchen appliance 102 to reperform the steps in block 73, 740, and 750.

In particular embodiments, at block 760, the hyperspectral imaging system of kitchen appliance 102 may construct a hyperspectral data cube by compiling the plurality of line scan images recorded at block 740 into a three-dimensional data cube 290. In particular embodiments, controller 650 of kitchen appliance may instruct one or more processors 104 to use the 3D data cube 290 constructed at block 760 to perform food identification and/or quality assessment of each object 220 (e.g., food) imaged. As an example and not by way of limitation, kitchen appliance 102, by extracting (x,y) subsets of the 3D data cube 290 at particular wavelengths, and/or by extracting wavelength subsets at a given (x,y) location, wherein images of objects 220 may be compared against a database of spectral information, wherein objects 220 may be identified. As another example and not by way of limitation, kitchen appliance 102 may instruct one or more processors 104 to execute instructions to repeat hyperspectral imaging and perform longitudinal quality monitoring of objects 220.

Figure 8:
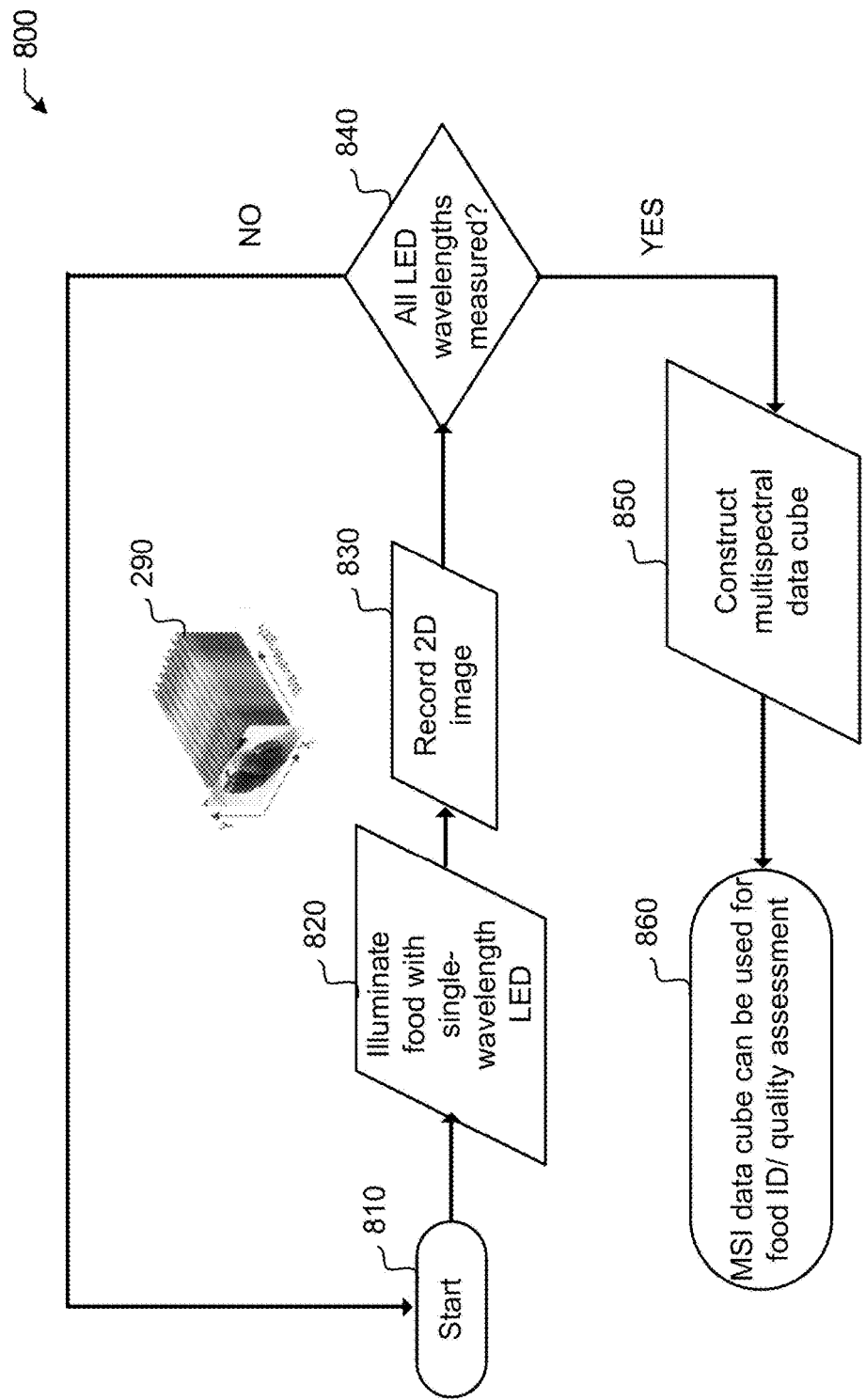
FIG. 8 illustrates an example workflow diagram depicting a technique for implementing multispectral imaging for a kitchen appliance.

FIG. 8 illustrates an example workflow diagram 800 depicting a technique for implementing multispectral imaging for a kitchen appliance 102. In particular embodiments, diagram 800 may begin at block 810, wherein one or more processor(s) 104 of kitchen appliance 102 may instruct a multi spectral imaging system of kitchen appliance 102 to illuminate food (e.g., objects 220) with a single-wavelength LEDs. As an example and not by way of limitation, kitchen appliance 102 may contain one or more single-wavelength LEDs in a plurality of positions within the interior of kitchen appliance 102. In particular embodiments, at block 830, controller 650 may send instructions to the multispectral imaging system of kitchen appliance 102 to record one or more two-dimensional images. As an example and not by way of limitation, one or more sensors 108 (e.g., cameras) located inside the interior of kitchen appliance 102 may record the one or more two-dimensional images of objects 220 illuminated by the single-wavelength LED light source, as in block 820.

In particular embodiments, at block 840, the multispectral imaging system of kitchen appliance 102 may evaluate the two-dimensional images recorded in block 830 to determine that all LED wavelengths have been measured in the two-dimensional images. In response to kitchen appliance 102 determining that all LED wavelengths have been measured in the two-dimensional images, controller 650 may instruct one or more processors 104 of kitchen appliance 102 to construct a multispectral data cube, as in block 850. In particular embodiments, kitchen appliance 102 may determine that all LED wavelengths in the recorded two-dimensional images have not been measured, in which case controller 650 may send instructions to the multispectral imaging system of kitchen appliance 102 to reperform the steps in blocks 810, 820, and 830, and 840 until all LED wavelengths have been measured in the recorded two-dimensional images.

In particular embodiments, at block 850, the multispectral imaging system of kitchen appliance 102 may construct a 3D data cube 290 by compiling the plurality of recorded two-dimensional images in block 830 into a three-dimensional image. In particular embodiments, at block 860, controller 650 of kitchen appliance 102 may instruct one or more processors 104 of kitchen appliance 102 to perform food identification and/or quality assessment of each food imaged with the 3D data cube 290 as constructed in block 850. In particular embodiments, kitchen appliance 102 may instruct one or more processors 104 to store each image containing spectrum information locally in memory 106 of kitchen appliance 102, wherein each image may further train one or more machine-learning based algorithms for identification and/or classification of objects 220. As another example and not by way of limitation, kitchen appliance 102 may instruct controller 650 to store each image containing spectrum information externally in one or more external datastores, databases, and/or other suitable storage location. As an example and not by way of limitation, the database containing spectral information about a plurality of objects 220 (e.g., food items) may be continuously updated by kitchen appliance 102. In particular embodiments, one or more algorithms may be used to classify a plurality of objects 220 from a calibrated measurement of the objects spectrum as compared to the stored spectral information for a variety of objects. As an example and not by way of limitation, one or more algorithms such as least-squares fitting, principal component analysis, support vector machines (SVM), and/or neural network systems may be applied to the database of spectrum information. As another example and not by way of limitation, kitchen appliance 102 may instruction one or more processors 104 to perform one or more computer-vision segmentation algorithms for object identification.

Figure 9:
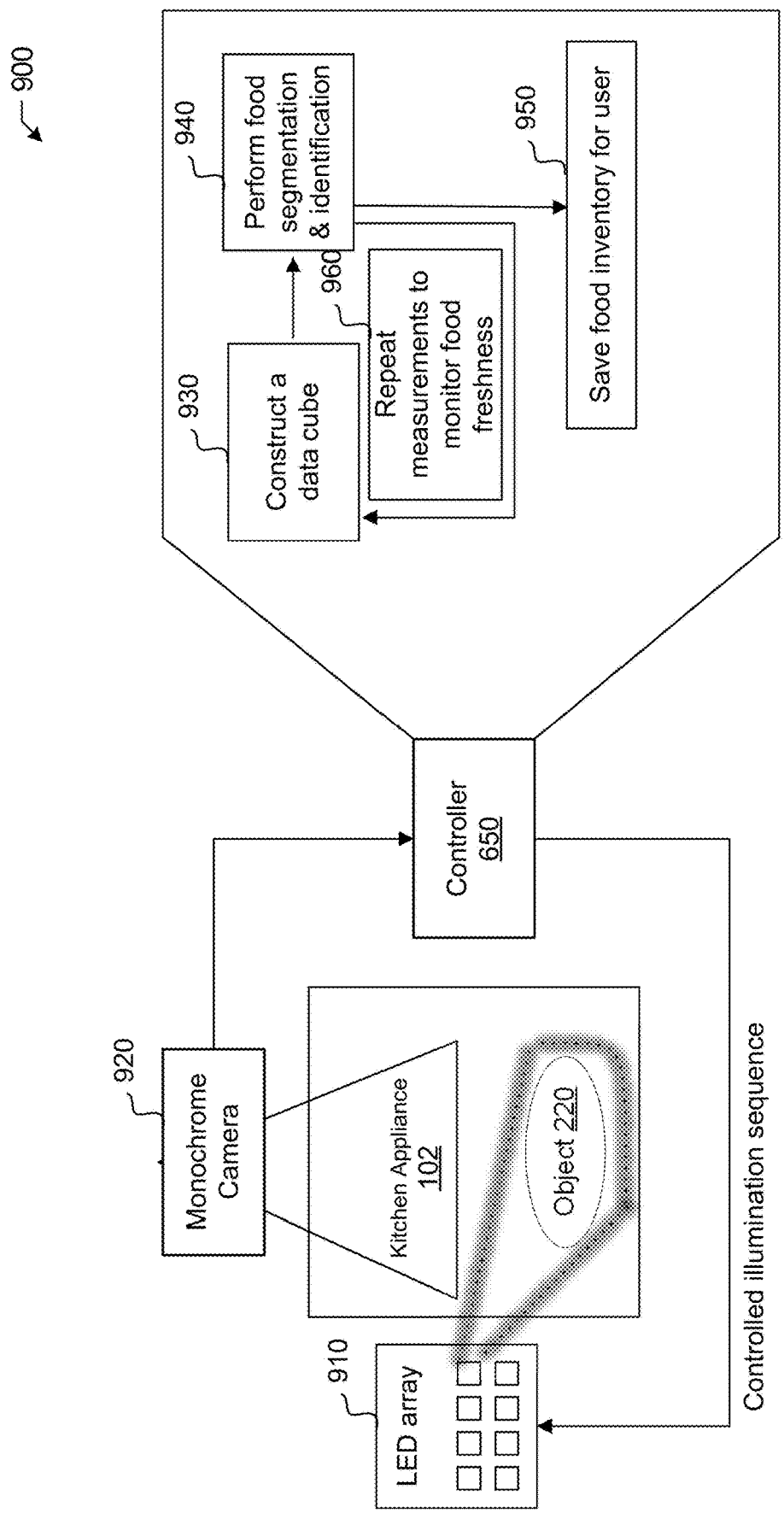
FIG. 9 illustrates an example workflow diagram depicting a technique for food quality monitoring through multispectral imaging under single-wavelength illumination.

FIG. 9 illustrates an example workflow diagram 900 depicting a technique for food quality monitoring through multispectral imaging under single-wavelength illumination. In particular embodiments, the multispectral imaging system of kitchen appliance 102 may use LED array 910 as an illumination source 210 within the interior of the kitchen appliance 102. As an example and not by way of limitation, LED array 910 may direct illumination onto one or more objects 220 within the interior of kitchen appliance 102. As another example and not by way of limitation, LED array 910 may emit narrow-band light from a multichromatic LED array.

In particular embodiments, monochrome camera 920 may be communicatively coupled to controller 650. As an example and not by way of limitation, monochrome camera 920 may be placed in the interior of kitchen appliance 102 an capture two-dimensional images of objects 220 illuminated by single wavelength illumination generated by LED array 910. In particular embodiments, controller 650 may generate instructions to the multispectral imaging system of kitchen appliance 102 to generate a controlled illumination sequence into the interior of kitchen appliance 102 by LED array 910.

In particular embodiments, after monochrome camera 920 captures one or more two-dimensional images, controller 650 may instruct the multispectral imaging system of kitchen appliance 102 to step through a plurality of illumination wavelengths and record images (e.g., X×Y images) at each wavelength to construct a 3D data cube. In particular embodiments, as displayed by diagram 900, at block 930, controller 650 may instruct the multispectral imaging system of kitchen appliance 102 to construct a 3D data cube 290 (e.g., multispectral data cube) by compiling the plurality of images captured by monochrome camera at block 920. In particular embodiments, after constructing the 3D data cube 290, at block 940, controller 650 may instruct the multispectral imaging system of kitchen appliance 102 to perform food segmentation and/or food identification. As an example and not by way of limitation, controller 650 may use the image data, either alone or in combination with one or more computer vision approaches to segment the individual food items (e.g., objects 220) and classify the food according to one or more food types.

In particular embodiments, controller 650 may instruct the imaging system of kitchen appliance 102 to save the segmented and identified food items, as identified in block 940, to a food inventory 220 stored in the kitchen appliance 102 at block 950. As an example and not by way of limitation, the food may not be identified by the imaging system of kitchen appliance 102, in which case controller 650 may instruct the imaging system to repeat measurements and generate updated images of the objects 220. As an example and not by way of limitation, the database of food items may be stored locally in memory 106 of kitchen appliance 102. As another example and not by way of limitation, the database of food items may be stored externally at one or more servers, wherein one or more processors 104 of kitchen appliance 102 may instruct network interface 116 to retrieve the database of food items from one or more external locations (e.g., remote server(s), cloud storage database(s)). For example, the imaging system of kitchen appliance 102 may save the identified individual food items located in the interior of kitchen appliance 102 in order to respond to one or more queries by a user.

In particular embodiments, at block 960, controller 650 may instruct the imaging system of kitchen appliance 102 to repeat the measurements at blocks 930, 940, and 950 indefinitely. For each food item identified, key spectral indicators may be stored and tracked over time. As an example and not by way of limitation, as the imaging system of kitchen appliance 102 repeats measurements, the user may be informed if one or more individual food items deviate beyond a particular threshold, which may indicate a substantial change in quality of the food items.

Figure 10:
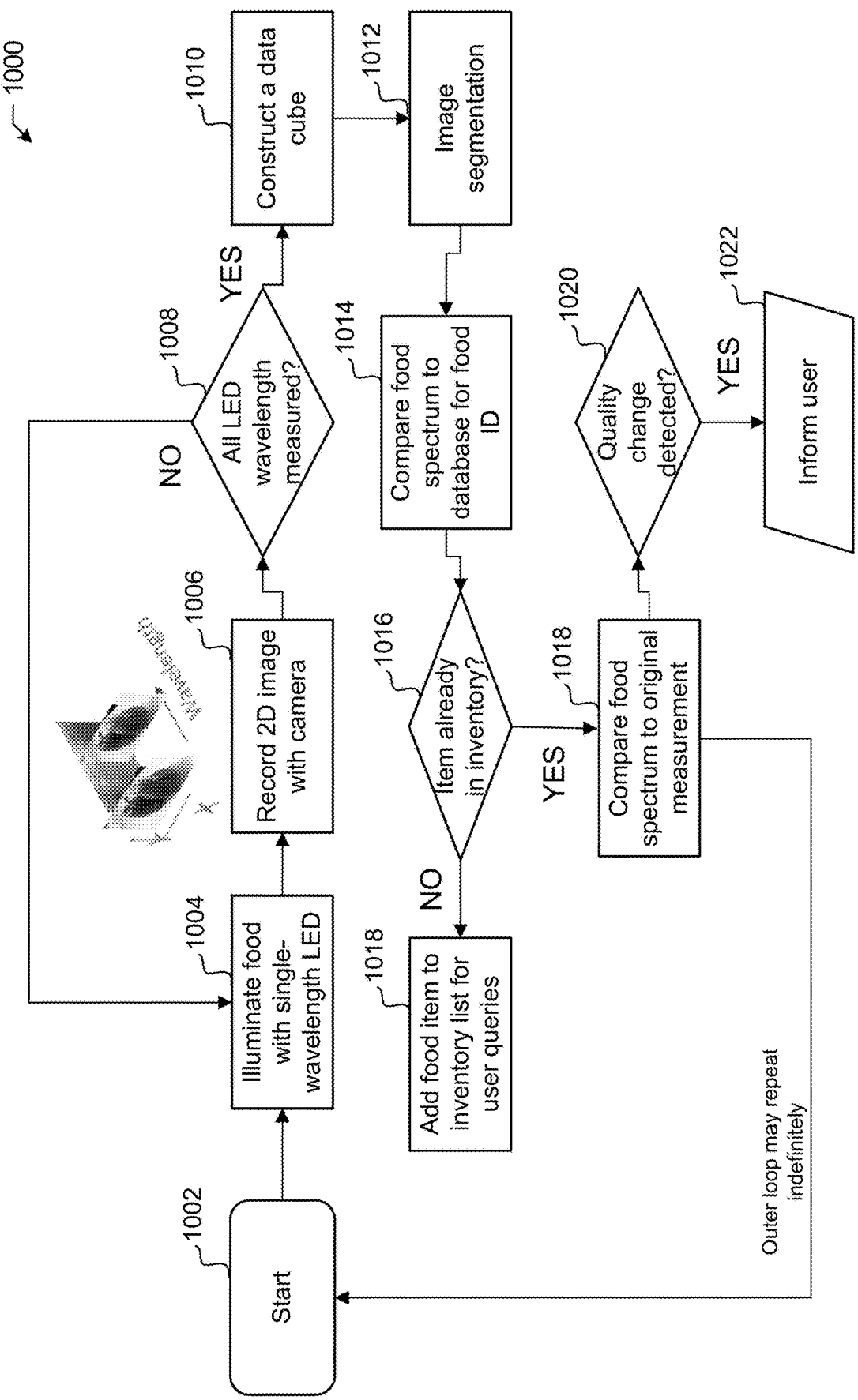
FIG. 10 illustrates an example workflow diagram depicting a technique for food quality monitoring through multispectral imaging of a kitchen appliance.

FIG. 10 illustrates an example workflow diagram 1000 depicting a technique for food quality monitoring through multispectral imaging of a kitchen appliance 102. In particular embodiments, diagram 1000 may begin at block 1002, wherein controller 650 of the multispectral imaging system of kitchen appliance 102 may instruct a single-wavelength LED (e.g., illumination sources 210) to illuminate objects 220 within the interior of kitchen appliance 102, as in block 1004. At block 1006, controller 650 may send instructions to the multispectral imaging system of kitchen appliance 102 to record one or more two-dimensional images with a camera located in the interior of kitchen appliance 102. As an example and not by way of limitation, the camera recording one or more two-dimensional images may be a monochrome camera 920. In this example, the monochrome camera of kitchen appliance 102 may capture a plurality of two-dimensional images of the interior of kitchen appliance 102 (e.g., in the X×Y dimension) at a plurality of distinct wavelengths.

In particular embodiments, at block 1008, the multispectral imaging system of kitchen appliance 102 may evaluate the one or more two-dimensional images recorded at block 1006 to determine that all LED wavelengths have been measured in the two-dimensional image(s). In response to determining that all LED wavelengths have been measured in the recorded two-dimensional images, controller 650 may instruct one or more processors 104 of kitchen appliance 10 to construct a 3D data cube 290, as in block 1010. In particular embodiments, the multispectral imaging system of kitchen appliance 102 may determine that all LED wavelengths have not been measured, in which case controller 650 may send instructions to the multispectral imaging system of kitchen appliance 102 to reperform the steps of block 1004, 1006, and 1008 until all LED wavelengths have been measured in the recorded two-dimensional images.

In particular embodiments, after the 3D data cube 290 is constructed, as discussed in block 1010, controller 650 may instruct the multispectral imaging system of kitchen appliance 102 to perform image segmentation, as in block 1012. In particular embodiments, controller 650 of the multispectral imaging system of kitchen appliance 102 may perform food identification, as in block 1014. As an example and not by way of limitation, the segmented images of block 1012 may be compared to a database consisting of food spectrum data for food identification. For example, the segmented image of a red apple (e.g., object 220) may be compared against the database of food spectrum data, wherein the multispectral imaging system may compare the images to a plurality of images with similar spectrum data until the system reaches a confidence value above a certain threshold of object 220 identification.

In particular embodiments, in response to the food identification in block 1014, the multispectral imaging system of kitchen appliance 102 may determine the food item presently exists in a record of the food item inventory of kitchen appliance 102. As an example and not by way of limitation, the record of food item inventory may be stored locally in memory 106 of kitchen appliance 102. As another example and not by way of limitation, the record of food item inventory may be stored externally by one or more separate servers. For example, the multispectral imaging system of kitchen appliance 102 may determine that the red apple has been previously stored in the food item inventory of kitchen appliance 102, and will not add the identified red apple to the inventory record. In an alternate example, the multispectral imaging system of kitchen appliance 102 may determine that an avocado has not been previously stored in the food item inventory of kitchen appliance 102, thereby indicating to the multispectral imaging system that the avocado is a new item and subsequently adds the avocado to the food item inventory. In particular embodiments, in response to the food identification in block 1014, the multispectral imaging system of kitchen appliance 102 may determine the food item does not presently exist in a record of the food item inventory of kitchen appliance 102, in which case the multispectral imaging system may add the identified food item to an inventory list at block 1018. As an example and not by way of limitation, the food inventory list may be presented to a user via a user interface of kitchen appliance 102. In this example, the user may interact with the food inventory list through one or more selectable options presented by the user interface of kitchen appliance 102.

In particular embodiments, in response to the multispectral imaging system of kitchen appliance 102 determining that the identified foods in block 1040 are presently recorded in a food inventory list, controller 650 may instruct the multispectral imaging system to compare the most recent set of recorded two-dimensional images to an original measurement at block 1018. In particular embodiments, in response to determining the food item presently exists in the food inventory list, controller 650 may instruct the multispectral imaging system to repeat measurements indefinitely. As an example and not by way of limitation, controller 650 may instruct the multispectral imaging system to reperform the steps in blocks 1002, 1004, 1006, 1008, 1010, 1012, 1014, 1016, and 1018 until achieving a termination criteria. In this example, a termination criterion may be removal of the food item from inventory. As an example and not by way of limitation, if the multispectral imaging system of kitchen appliance 102 determines that the red apple is already in the food item inventory of kitchen appliance 102, the multispectral imaging system may reperform the image capture process indefinitely, and after a few days the multispectral imaging system may detect a change in the quality of the red apple. In this example, the kitchen appliance 102 may provide a notification to a user via the user interface of kitchen appliance 102 containing information that the quality of the red apple is decreasing (e.g., the apple is rotting). As another example and not by way of limitation, kitchen appliance 102 may generate recipe suggestions based upon the identified foods within the interior of the appliance. For example, kitchen appliance 102 may present a recipe suggestion to a user via a user interface of the kitchen appliance 102, wherein the recipe uses raw food ingredients determined to soon suffer a degradation in quality. For example, if vegetables in a user's refrigerator are soon to expire, the kitchen appliance 102 may recommend a salad recipe to the user via a user interface of kitchen appliance 102.

Figure 11:
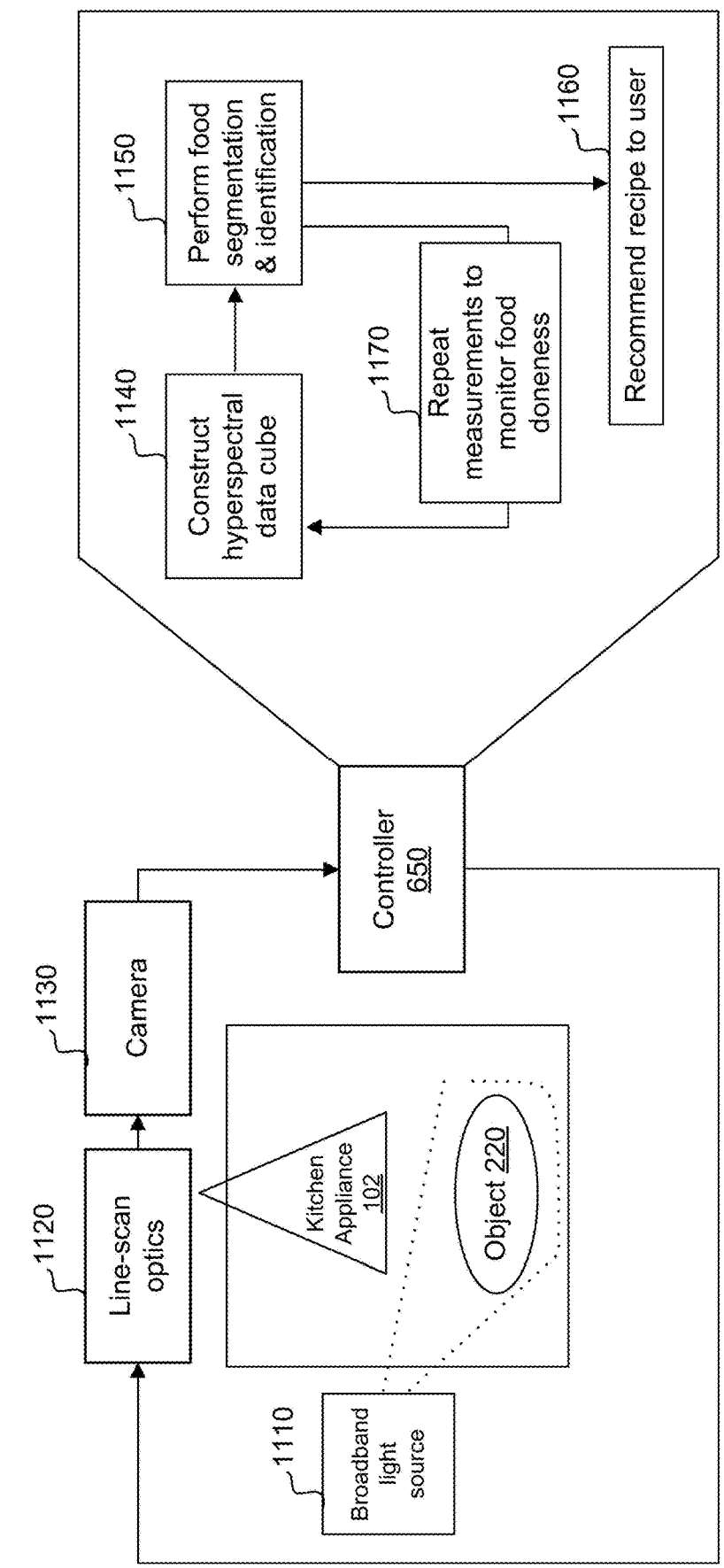
FIG. 11 illustrates an example workflow diagram depicting a technique for automated cooking monitoring through hyperspectral imaging of a kitchen appliance.

FIG. 11 illustrates an example workflow diagram 1100 depicting a technique for automated cooking monitoring through hyperspectral imaging of kitchen appliance 102. In particular embodiments, the hyperspectral imaging system of kitchen appliance 102 (e.g., microwave oven) may use broadband light source 1110 as an illumination source within the interior of kitchen appliance 102. As an example and not by way of limitation, the broadband light source 1110 may direct illumination onto one or more objects 220 within the interior of kitchen appliance 102. In particular embodiments, at block 1120, line-scan optics located within kitchen appliance 102 may capture two-dimensional images of objects 220 illuminated by the broadband light source 1110. In particular embodiments, line scan optics, as in block 1120 may be communicatively coupled to camera 1130.

In particular embodiments, after line scan optics in block 1120 and camera 1130 capture two-dimensional images, controller 650 may instruct the hyperspectral imaging system of kitchen appliance 102 to sweep the line image through the scene, recording two-dimensional images (e.g., Y×λ) for each line. As an example and not by way of limitation, controller 650 may perform optomechanical control of the line scan optics in block 1120 for scanning line-images for capture by the camera 1130. In particular embodiments, at block 1140, controller 650 may instruct the hyperspectral imaging system of kitchen appliance 102 to construct a 3D data cube 290 by compiling the plurality of images captured by the line-scan optics and camera 1130. In particular embodiments, after constructing the 3D data cube 290 at block 1140, controller 650 may instruct the hyperspectral imaging system of kitchen appliance 102 to perform food segmentation and/or identification at block 1150. As an example and not by way of limitation, controller 650 may use the image data, either alone or in combination with one or more computer vision approaches to segment the individual food items (e.g., objects 220) and classify the food according to one or more food types. The segmentation and identification of individual food items may allow kitchen appliance 102 to recommend a cooking schedule to the user based on the foods identified by the hyperspectral imaging system. For example, if the user places potatoes within the interior of a microwave oven (e.g., kitchen appliance 102), the hyperspectral imaging system of kitchen appliance 102 may identify the object 220 as potatoes and subsequently recommend one or more cooking schedules to the user based on the identified foods within the interior of the microwave oven.

In particular embodiments, after performing food segmentation and/or identification as in block 1150, kitchen appliance 102 may recommend a recipe to the user via a user interface of kitchen appliance 102 as in block 1160. As an example and not by way of limitation, a user may select the recommended recipe via the user interface of kitchen appliance 102, in which case kitchen appliance 102 may perform temperature scheduling and/or the cooking process in accordance with the selected recipe. As another example and not by way of limitation, the HSI system of kitchen appliance 102 may image foods to perform an automatic analysis of suggested cooking time between based on particular qualities of the foods. For example, the cook time may differ for bone-in versus boneless cuts of meat, as well as relative fat and muscle content of the meat. In this way, kitchen appliance 102 may adjust the temperature and cooking time based on the cut of meat.

In particular embodiments, at block 1170, after performing food segmentation and/or identification as in block 1150, controller 650 may instruct the hyperspectral imaging system of kitchen appliance 102 to repeat measurements to monitor food doneness over the duration of the cooking process. As an example and not by way of limitation during the cooking process, controller 650 may monitor the spectra of selected foods for changes over time that indicate doneness. As another example and not by way of limitation, in response to identifying markers of food doneness, controller 650 may instruct one or more heating elements within kitchen appliance 102 to terminate the heating process.

Figure 12:
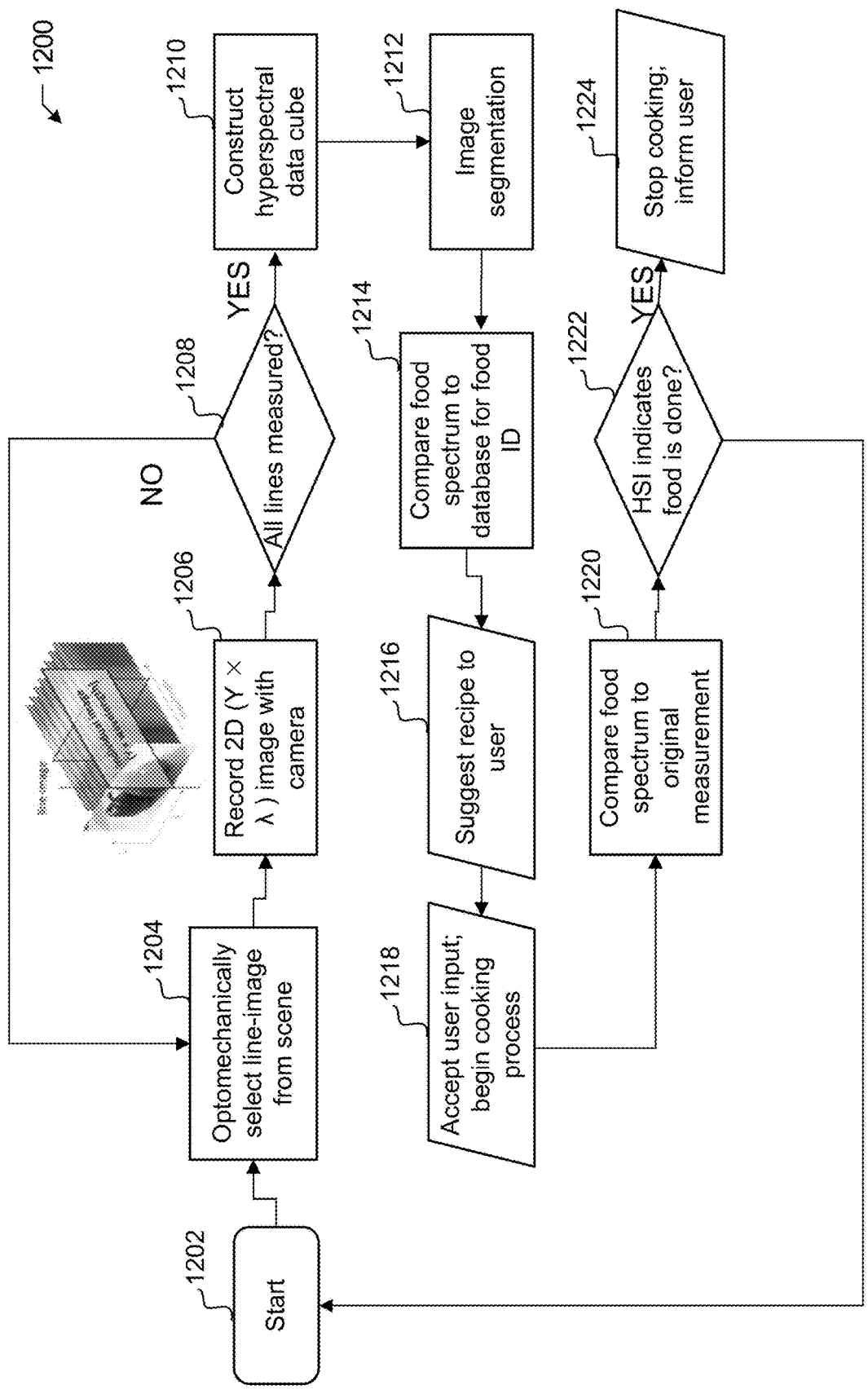
FIG. 12 illustrates an example workflow diagram depicting a technique for automated cooking monitoring through hyperspectral imaging of a kitchen appliance.

FIG. 12 illustrates an example workflow diagram 1200 depicting a technique for automated cooking monitoring through hyperspectral imaging of kitchen appliance 102. In particular embodiments, diagram 1200 may begin at block 1202, wherein controller 650 of the hyperspectral imaging system of kitchen appliance 102 may optomechanically select a line-image from a scene of the interior of kitchen appliance 102, as in block 1204. At block 1206, controller 650 may send instructions to the hyperspectral imaging system of kitchen appliance to record one or more two-dimensional images with a camera. As an example and not by way of limitation, the camera recording the one or more two-dimensional images in block 1206 may be a monochrome camera 920.

In particular embodiments, at block 1208, controller 650 of the hyperspectral imaging system of kitchen appliance 102 may evaluate the one or more two-dimensional images recorded at block 1206 to determine that all lines have been measured. In response to controller 650 determining all lines have been measured in block 1208, controller 650 may instruct the hyperspectral imaging system to construct a hyperspectral data cube, as in block 1210. In particular embodiments, at block 1208, controller 650 of the hyperspectral imaging system may determine that all lines have not been measured, in which case controller 650 may send instructions to the hyperspectral imaging system to repeat the steps of block 1204, 1206, and 1208 until all lines have been measured.

At block 1212 the controller 650 of the hyperspectral imaging system may perform image segmentation of the recorded two-dimensional images. Next, at block 1214, controller 650 of the hyperspectral imaging system may perform food identification by comparing the segmented images against a database consisting of food spectrum data. As an example and not by way of limitation, the hyperspectral imaging system of kitchen appliance 102 may store a database of known food items locally in memory 106, or externally on one or more separate servers and/or cloud databases.

In particular embodiments, after the food is identified by the hyperspectral imaging system at block 1214, the controller 650 may generate instructions to suggest a recipe to a user via a user interface of kitchen appliance 102, as in block 1216. In particular embodiments, in response to receiving user input via a user interface of kitchen appliance 102, controller 650 may instruct one or more heating elements within kitchen appliance 102 to emit radiation into the interior of the kitchen appliance 102, thereby beginning the cooking process in block 1218. At block 1220, previously stored food spectrum data may be compared to the real-time two-dimensional images recorded by one or more sensors 108 of kitchen appliance 102. At block 1222, controller 650 of the hyperspectral imaging system may determine the food is done cooking through a comparison of previously stored cooking data of cooked food and real time two-dimensional images recorded by a camera in block 1206. In particular embodiments, the hyperspectral imaging system of kitchen appliance 102 may determine the food in the interior of kitchen appliance 102 is done cooking, wherein controller 650 may send instructions to one or more heat emitters of kitchen appliance 102 to terminate the emission of heat and inform the user that the cooking process is complete via a user interface of kitchen appliance 102, as in block 1224. In particular embodiments, controller 650 may determine that the food within the interior of kitchen appliance 102 is not finished cooking, in which case controller 650 may instruct the hyperspectral imaging system to reperform the steps of blocks 1202, 1204, 106, 1208, 1210, 1212, 1214, 1216, 1218, 1220, and 1222 until controller 650 determines the food is done cooking.

Figure 13:
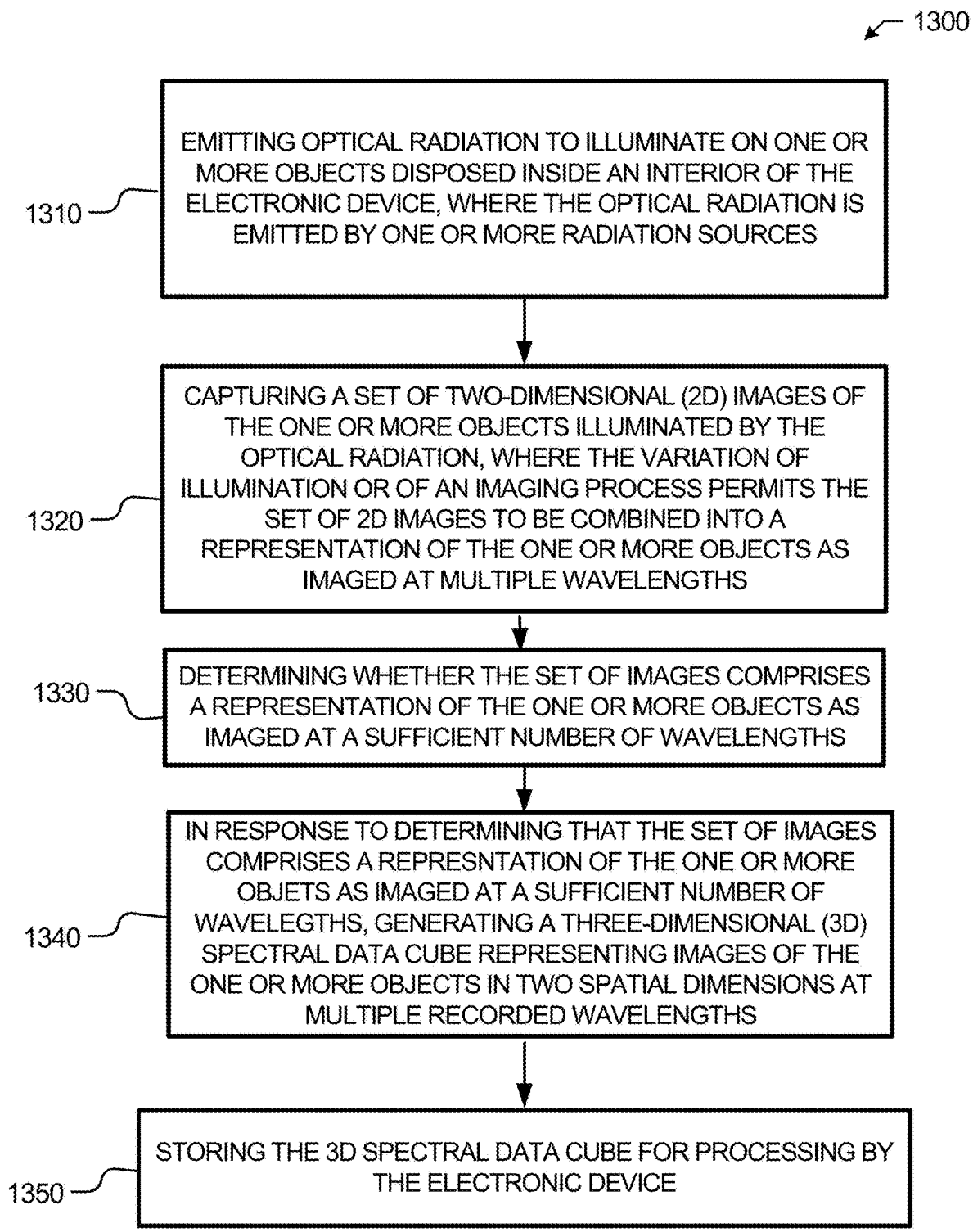
FIG. 13 illustrates a flow diagram of a method for employing controlled illumination for hyperspectral and/or multispectral imaging of objects in a kitchen appliance.

FIG. 13 illustrates a flow diagram of method 1300 for employing controlled illumination for hyperspectral and/or multispectral imaging of objects 220 in kitchen appliance 102. The method 1300 may be performed utilizing one or more electromagnetic devices (e.g., kitchen appliance 102) that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), or any other processing device(s) that may be suitable for processing image data), software (e.g., instructions running/executing on one or more processors), firmware (e.g., microcode), or some combination thereof.

The method 1300 may begin at block 1310 with the electronic device (e.g., kitchen appliance 102) emitting optical radiation (e.g., spectral illumination) to illuminate one or more first objects disposed inside an interior of the electronic device. As an example and not by way of limitation, the optical radiation may be emitted by one or more radiation sources located within the interior of kitchen appliance 102. As another example and not by way of limitation, optical radiation may include a broad band illumination source, and narrow-band illumination source, a broad spectrum LED, a single wavelength LED, LED array, or any suitable illumination source 210.

The method 1300 may then continue at block 1320 where the electronic device (e.g., kitchen appliance 102) may capture a first set of 2D images of the one or more first objects illuminated by the optical radiation, wherein the variation of illumination and/or variation of the imaging process permits the first set of 2D images to be combined into a representation of the one or more objects as imaged at multiple wavelengths. As an example and not by way of limitation, each image of the first set of images may portray the one or more first objects at one or more recorded wavelengths. As another example and not by way of limitation, each image of the first set of images may alternatively portray the one or more line scans of a one-dimensional slice of the scene, with the other dimension of the image representing a variation of that line scan across different wavelengths. The first set of images of the one or more first objects illuminated by the optical radiation may be captured by one or more sensor(s) 108 of kitchen appliance 102, including but not limited to a camera, monochrome camera, or any suitable sensor.

The method 1300 may then continue at block 1330 with the electronic device (e.g., kitchen appliance 102) determining whether the first set of images comprises a representation of the one or more objects as imaged at a sufficient number of total recorded wavelengths. In particular embodiments, method 1300 may continue at block 1340, wherein in response to determining that the first set of images comprises a representation of the one or more objects as imaged at a sufficient number of total recorded wavelengths, generating a three-dimensional (3D) spectral data cube representing images of the of the one or more first objects in two spatial dimensions at multiple recorded wavelengths. As an example and not by way of limitation, the first set of images may be compiled to generate the spectral map (e.g., 3D data cube 290) of the one or more first objects.

The method 1300 may then continue at block 1350 with the electronic device (e.g., kitchen appliance 102) storing the 3D spectral map (e.g., 3D data cube 290) for processing by the electronic device. As an example and not by way of limitation, the kitchen appliance 102 may store the 3D spectral map locally in memory 106 of kitchen appliance 102. As another example and not by way of limitation, kitchen appliance 102 may store the 3D spectral map externally in one or more databases, datastores, and/or other suitable external storage location accessible via network interface 116.

In particular embodiments, controller 650 may instruct the hyperspectral and/or multispectral imaging systems to retrieve stored 3D spectral maps (e.g., 3D spectral data cube 290) of the one or more first objects and determine one or more similarities between the 3D spectral data cube 290 of the first objects and one or more previously stored 3D spectral data cubes 290 of one or more second objects of one or more object types. Controller 650 may then classify one or more of the first objects based on the determined similarities between the one or more first objects and the previously stored 3D spectral data cubes of one or more second objects.

In particular embodiments, the hyperspectral and/or multispectral imaging systems of kitchen appliance 102 may calculate a probability score through one or more machine-learning models that each of the first objects are associated with a particular object type. As an example and not by way of limitation, based on the comparison between the 3D spectral map of the first sequence of the plurality of images and the previously stored 3D spectral maps of a plurality of object types, one or more processors 104 of the hyperspectral and/or multispectral imaging systems of kitchen appliance 102 may calculate, through one or more machine-learning systems, a probability score that the first object type is associated with a particular object type for each of the one or more first objects. In particular embodiments, the hyperspectral and/or multispectral imaging systems of kitchen appliance 102 may compare the probability score of each of the one or more first objects against a threshold score. As an example and not by way of limitation, the threshold may be predetermined and stored locally in the kitchen appliance 102 or, alternatively, stored externally by one or more external servers. In particular embodiments, kitchen appliance 102 may determine the probability score associated with the identification of the particular object is below or fails to meet the threshold, in which case controller 650 may instruct the hyperspectral and/or multispectral imaging systems to repeat measurements and capture updated sets of images of the one or more objects 220 illuminated by spectral illumination.

In particular embodiments, each of the first object with a probability score greater than the threshold score may be classified as being of the respective particular object type and store the identification of the particular object (e.g., the object is an avocado) locally (e.g., in memory 108) or externally in an inventory. As an example and not by way of limitation, each first object classified as being of the respective particular object type may be added to an inventory of the one or more first objects disposed inside the interior of the kitchen appliance 102. As another example and not by way of limitation, one or more machine-learning systems of kitchen appliance 102 may generate recommendations to be displayed on a user interface of the kitchen appliance 102 based on the inventory of the classified one or more objects disposed inside the interior of the electronic device. For example, the recommendation may be a recipe that includes ingredients identified within the interior of the kitchen appliance 102. As another example, the kitchen appliance 102 may generate a recommendation that a user consume a particular object within a period of time, before the quality of the object decreases. In this example, the kitchen appliance 102 (e.g., refrigerator) may, for example, suggest that a user consume the salmon before it spoils. Kitchen appliance 102 may determine a change in quality of the one or more first objects by capturing a second set of images of the one or more first objects illuminated by the spectral illumination, wherein a comparison between the first and second set of images may reflect a change in quality of the one or more objects.

Figure 14:
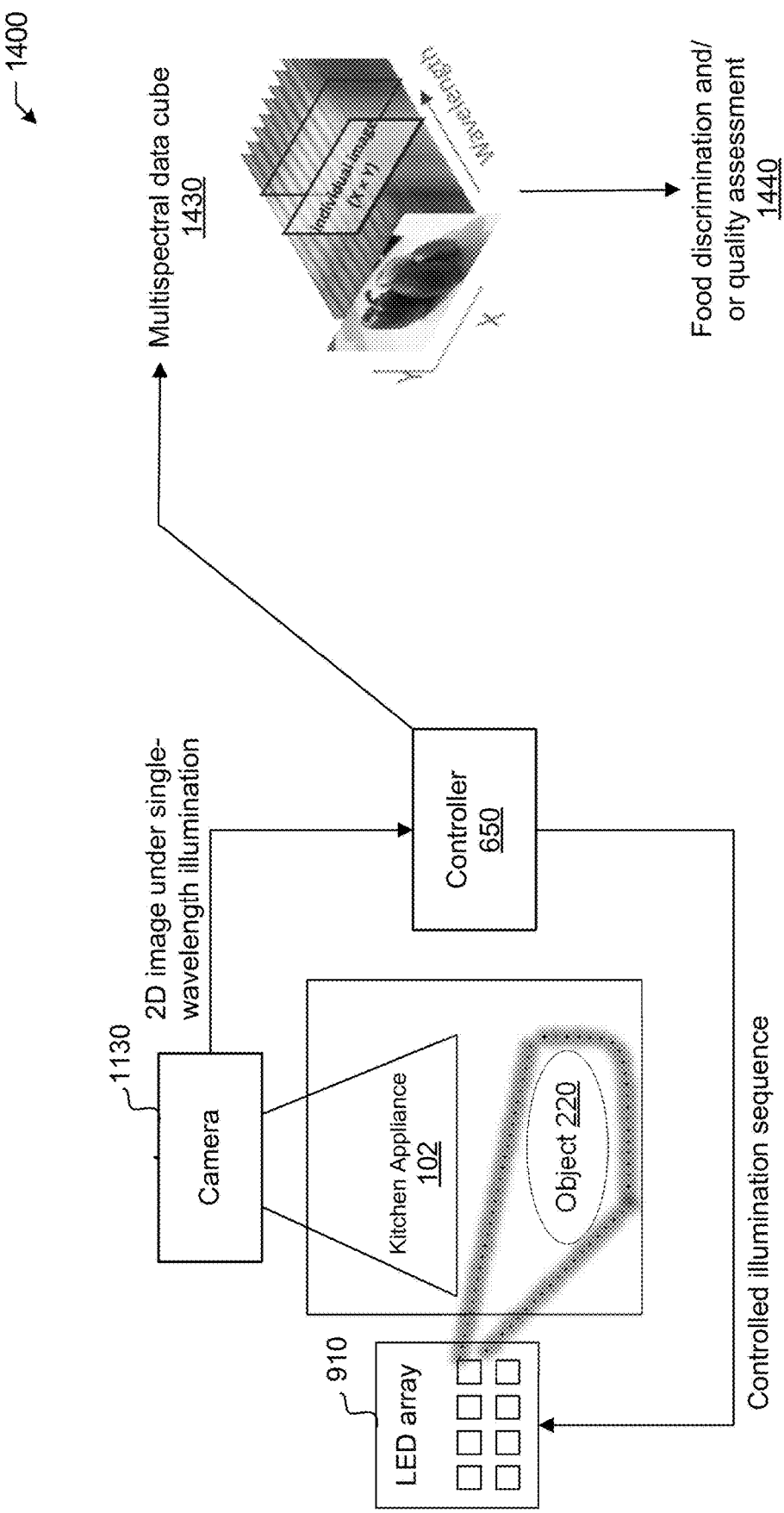
FIG. 14 illustrates an example workflow diagram depicting a technique for determining the spectral signature of objects disposed inside a kitchen appliance.

FIG. 14 illustrates an example workflow diagram 1400 depicting a technique for determining a spectral signature of objects 220 disposed inside kitchen appliance 102. In particular embodiments, the imaging system of kitchen appliance 102 may use LED array 910 as an illumination source 210 within the interior of kitchen appliance 102. As an example and not by way of limitation, LED array 910 may comprise multiple light-emitting diodes, each emitting at a narrow wavelength range. LED array 910 may be illuminated sequentially, and for each specific wavelength of illumination the objects 220 (e.g., food) inside kitchen appliance 102 may be imaged by camera 1130 (e.g., monochrome camera). In particular embodiments, controller 650 may combine each 2D image captured by camera 1130 into a multispectral data cube 1430, wherein the imaging system may perform object segmentation to isolate individual objects 220. In this example, the spectral signature of each item 220 may be used to identify the object 220, and perform food discrimination and/or quality assessment, as in step 1440. Step 1440 may be performed by the imaging system in combination with computer vision approaches based on visible-light images. In particular embodiments, step 1440 may be performed by slicing the hyperspectral data cube 1430 along different (x,y, wavelength) planes, allowing spectral information as a function of the desired spatial coordinates to be extracted.

Figure 15:
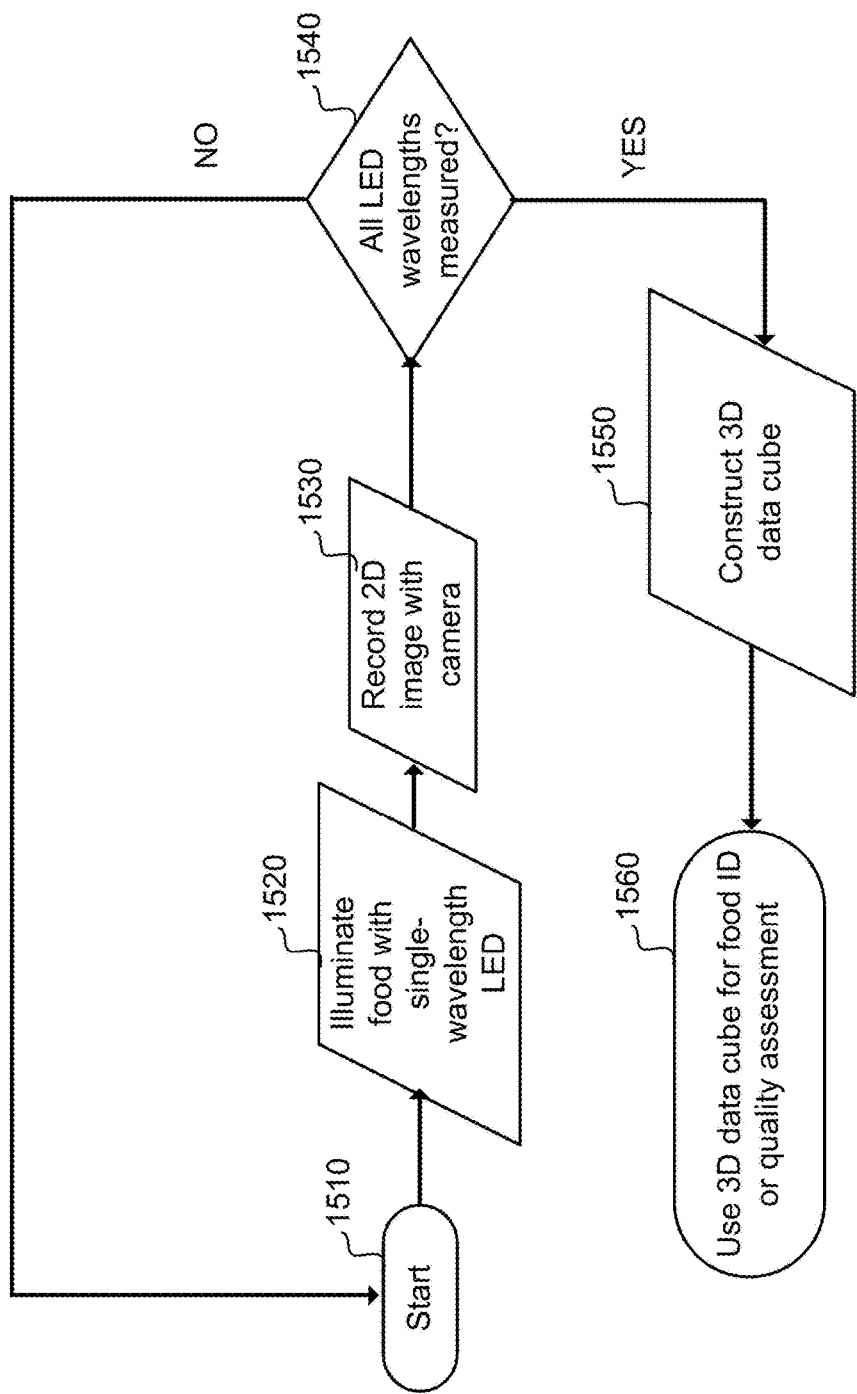
FIG. 15 illustrates an example workflow diagram depicting a technique for obtaining a 3D spectral data cube and subsequent analysis for food ID and/or quality assessment.

FIG. 15 illustrates an example workflow diagram 1500 depicting a technique for implementing imaging for a kitchen appliance 102. In particular embodiments, diagram 1500 may begin at block 1510, wherein one or more processor(s) 104 of kitchen appliance may instruct a hyperspectral imaging system of kitchen appliance 102 to illuminate food (e.g., objects 220). with a single-wavelength LEDs. As an example and not by way of limitation, kitchen appliance 102 may contain one or more single-wavelength LEDs in a plurality of positions within the interior of kitchen appliance 102. In particular embodiments, at block 1530, controller 650 may send instructions to the multispectral imaging system of kitchen appliance 102 to record one or more two-dimensional images of objects 220 illuminated by the single-wavelength LED as in block 1520 with camera 1130.

In particular embodiments, at block 1540, the multispectral imaging system of kitchen appliance 102 may evaluate the two-dimensional images recorded in block 1530 to perform a determination that all LED wavelengths have been measured in the two-dimensional images, as in block 1540. In response to kitchen appliance 102 determining that all LED wavelengths have been measured in the two-dimensional images as in block 1540, controller 650 may instruct one or more processors 104 of kitchen appliance 102 to construct a 3D data cube 290, as in block 1550. In particular embodiments, kitchen appliance 102 may determine that all LED wavelengths in the recorded two-dimensional images have not been measured, in which case controller 650 may send instructions to the multispectral imaging system of kitchen appliance 102 to reperform the steps in blocks 1510, 1520, and 1530, and 1540 until all LED wavelengths have been measured in the recorded two-dimensional images.

In particular embodiments, at block 1550, the hyperspectral imaging system of kitchen appliance 102 may construct a 3D data cube 290 by compiling the plurality of recorded two-dimensional images in block 1530 into a three-dimensional image. In particular embodiments, at block 1560, controller 650 of kitchen appliance 102 may instruct one or more processors 104 of kitchen appliance 102 to perform food identification and/or quality assessment of each food (e.g., object 220) imaged with the 3D data cube 290, as constructed in block 1550. In particular embodiments, kitchen appliance 102 may instruct one or more processors 104 to store each image containing spectrum information locally in memory 106 of kitchen appliance 102, wherein each image may further train one or more machine-learning based algorithms for identification and/or classification of objects 220. As another example and not by way of limitation, kitchen appliance 102 may instruct controller 650 to store each image containing spectrum information externally in one or more external datastores, databases, and/or other suitable storage location. As an example and not by way of limitation, the database containing spectral information about a plurality of objects 220 (e.g., food items) may be continuously updated by kitchen appliance 102. In particular embodiments, one or more algorithms may be used to classify a plurality of objects 220 from a calibrated measurement of the objects spectrum as compared to the stored spectral information for a variety of objects. As an example and not by way of limitation, one or more algorithms such as least-squared fitting, principal component analysis, support vector machines (SVM), and/or neural network systems may be applied to the database of spectrum information. As another example and not by way of limitation, kitchen appliance 102 may instruction one or more processors 104 to perform one or more computer-vision segmentation algorithms for object identification.

Figure 16:
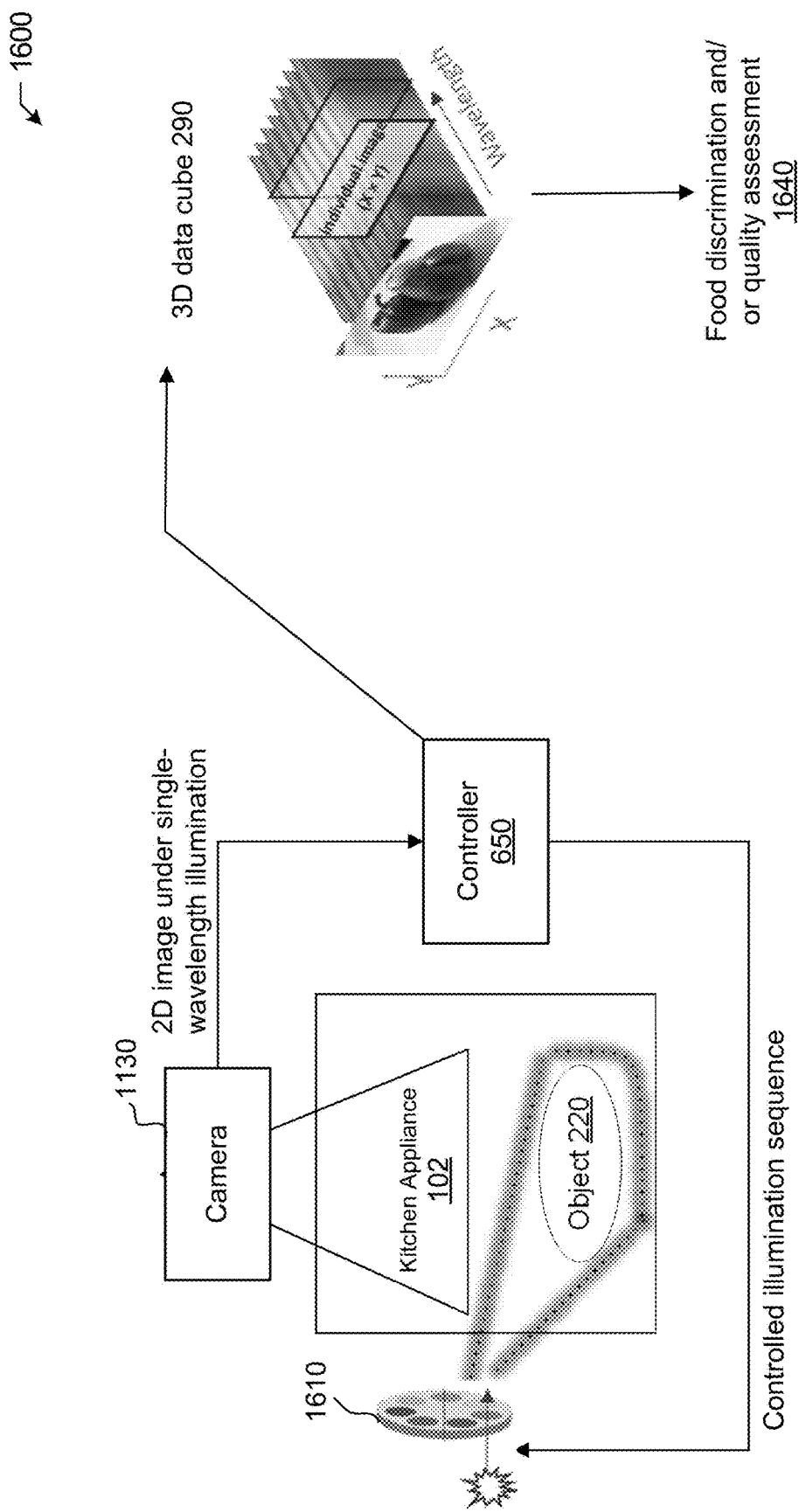
FIG. 16 illustrates an example workflow diagram depicting a technique for automated cooking and monitoring of a kitchen appliance.

FIG. 16 illustrates an example workflow diagram 1100 depicting a technique for automated cooking and monitoring of a kitchen appliance 102. In particular embodiments, the imaging system of kitchen appliance 102 (e.g., microwave oven) may use a broadband emitting light source 1610, in combination with an optical filter wheel, to illuminate one or more objects 220 disposed within kitchen appliance 102. As an example and not by way of limitation, the optical filter wheel may be used to generate a sequence of monochromatic (or nearly monochromatic) illumination sources.

In particular embodiments, camera 1130 may capture one or more two-dimensional images under single wavelength illumination. In particular embodiments, controller 650 may instruct the imaging system of kitchen appliance 102 to construct a 3D data cube 290 by compiling the plurality of two-dimensional images captured by camera 1130. In particular embodiments, controller 650 may use the image data 3D data cube 290, either alone or in combination with one or more computer vision approaches to segment the individual food items (e.g., objects 220), and perform food discrimination and/or quality assessment 1640. In particular embodiments, controller 650 may combine each 2D image captured by camera 1130 into a multispectral data cube, wherein the imaging system may perform object segmentation to isolate individual objects 220. In this example, the spectral signature of each item 220 may be used to identify the object 220, and perform food discrimination and/or quality assessment as in step 1640. Step 1640 may be performed by the imaging system in combination with computer vision approaches based on visible-light images.

Figure 17:
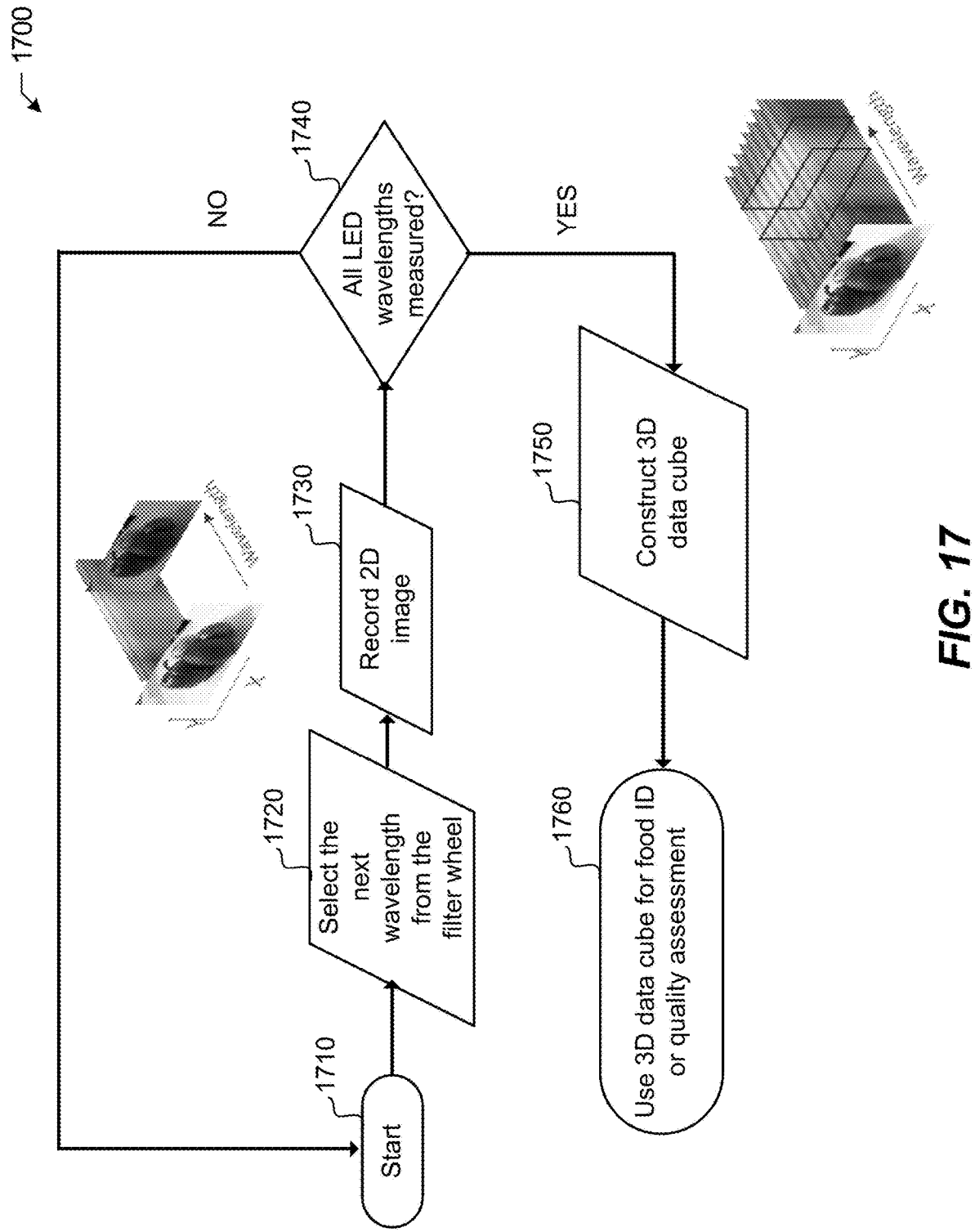
FIG. 17 illustrates an example workflow diagram depicting a technique for implementing spectral imaging for a kitchen appliance.

FIG. 17 illustrates an example workflow diagram 1700 depicting a technique for implementing spectral imaging for a kitchen appliance 102. In particular embodiments, diagram 1700 may begin at block 1710, wherein one or more processor(s) 104 of kitchen appliance 102 may instruct the imaging system of kitchen appliance 102 to illuminate food (e.g., objects 220) with illumination source 1610, wherein the imaging system may select a next wavelength from the filter wheel as described in FIG. 16. In particular embodiments, at block 1730, controller 650 may send instructions to the imaging system of kitchen appliance 102 to record one or more two-dimensional images.

In particular embodiments, at block 1740, the imaging system of kitchen appliance 102 may evaluate the two-dimensional images recorded in block 1730 to determine that all wavelengths have been measured in the two-dimensional images. In response to kitchen appliance 102 determining that all LED wavelengths have been measured in the two-dimensional images, controller 650 may instruct one or more processors 104 of kitchen appliance 102 to construct a 3D data cube 290, as in block 1750. In particular embodiments, kitchen appliance 102 may determine that all LED wavelengths in the recorded two-dimensional images have not been measured, in which case controller 650 may send instructions to the multispectral imaging system of kitchen appliance 102 to repeat the steps in blocks 1710, 1720, and 1730, and 1740 until all LED wavelengths have been measured in the recorded two-dimensional images.

In particular embodiments, at block 1750, the imaging system of kitchen appliance 102 may construct a 3D data cube 290 by compiling the plurality of recorded two-dimensional images in block 1730 into a three-dimensional image. In particular embodiments, at block 1760, controller 650 of kitchen appliance 102 may instruct one or more processors 104 of kitchen appliance 102 to perform food identification and/or quality assessment of each food imaged with the 3D data cube 290 as constructed in block 1750. In particular embodiments, kitchen appliance 102 may instruct one or more processors 104 to store each image containing spectrum information locally in memory 106 of kitchen appliance 102, wherein each image may further train one or more machine-learning based algorithms for identification and/or classification of objects 220.

Systems and Methods

Figure 18:
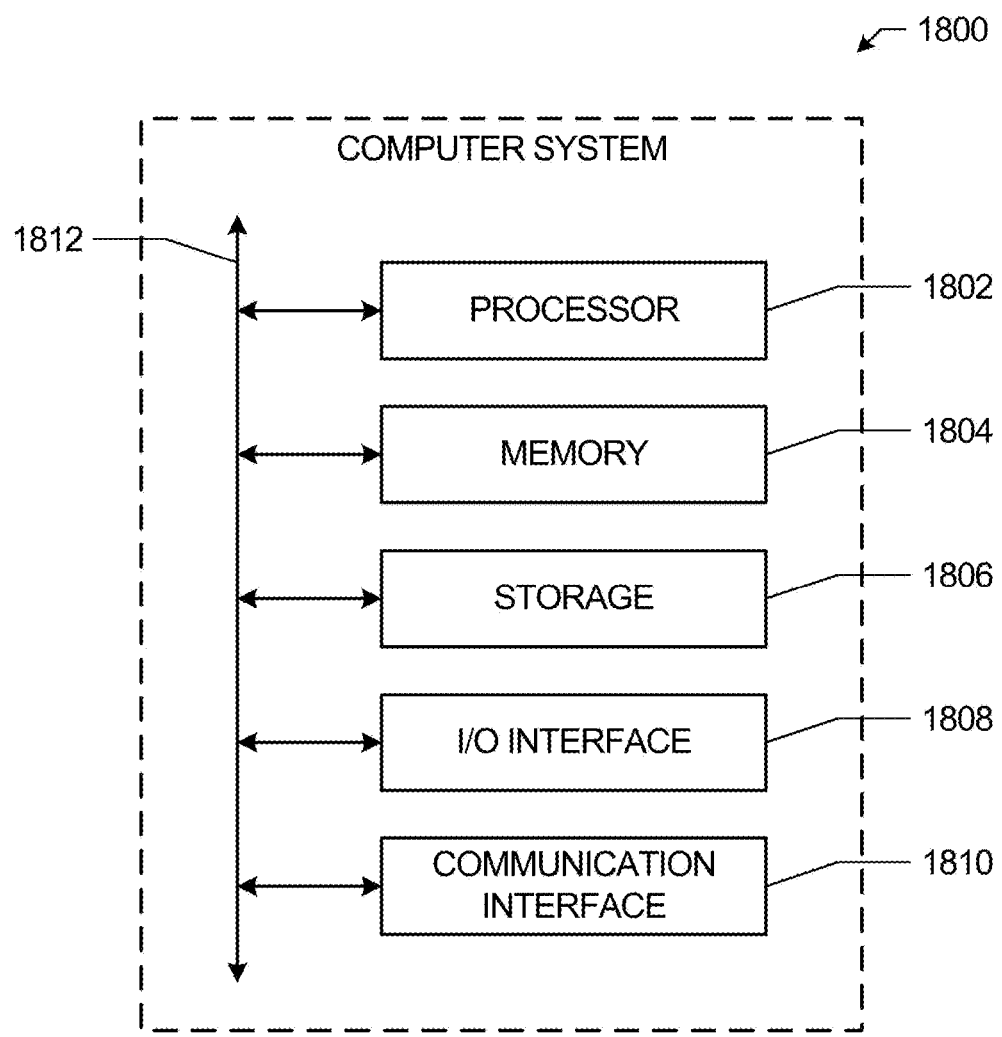
FIG. 18 illustrates an example computer system.

FIG. 18 illustrates an example computer system 1800. In particular embodiments, computer system 1800 may be utilized to employ controlled illumination for hyperspectral and/or multispectral imaging of food in kitchen appliance 102. In particular embodiments, one or more computer systems 1800 perform one or more steps of one or more methods described or illustrated herein. In particular embodiments, one or more computer systems 1800 provide functionality described or illustrated herein. In particular embodiments, software running on one or more computer systems 1800 performs one or more steps of one or more methods described or illustrated herein or provides functionality described or illustrated herein. Particular embodiments include one or more portions of one or more computer systems 1800. Herein, reference to a computer system may encompass a computing device, and vice versa, where appropriate. Moreover, reference to a computer system may encompass one or more computer systems, where appropriate.

This disclosure contemplates any suitable number of computer systems 1800. This disclosure contemplates computer system 1800 taking any suitable physical form. As example and not by way of limitation, computer system 1800 may be an embedded computer system, a system-on-chip (SOC), a single-board computer system (SBC) (e.g., a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1800 may include one or more computer systems 1800; be unitary or distributed; span multiple locations; span multiple machines; span multiple data centers; or reside in a cloud, which may include one or more cloud components in one or more networks.

Where appropriate, one or more computer systems 1800 may perform without substantial spatial or temporal limitation one or more steps of one or more methods described or illustrated herein. As an example, and not by way of limitation, one or more computer systems 1800 may perform in real time or in batch mode one or more steps of one or more methods described or illustrated herein. One or more computer systems 1800 may perform at different times or at different locations one or more steps of one or more methods described or illustrated herein, where appropriate.

In particular embodiments, computer system 1800 includes a processor 1802, memory 1804, storage 1806, an input/output (I/O) interface 1808, a communication interface 1810, and a bus 1812. Although this disclosure describes and illustrates a particular computer system having a particular number of particular components in a particular arrangement, this disclosure contemplates any suitable computer system having any suitable number of any suitable components in any suitable arrangement. In particular embodiments, processor 1802 includes hardware for executing instructions, such as those making up a computer program. As an example, and not by way of limitation, to execute instructions, processor 1802 may retrieve (or fetch) the instructions from an internal register, an internal cache, memory 1804, or storage 1806; decode and execute them;

and then write one or more results to an internal register, an internal cache, memory 1804, or storage 1806. In particular embodiments, processor 1802 may include one or more internal caches for data, instructions, or addresses. This disclosure contemplates processor 1802 including any suitable number of any suitable internal caches, where appropriate. As an example, and not by way of limitation, processor 1802 may include one or more instruction caches, one or more data caches, and one or more translation lookaside buffers (TLBs). Instructions in the instruction caches may be copies of instructions in memory 1804 or storage 1806, and the instruction caches may speed up retrieval of those instructions by processor 1802.

Data in the data caches may be copies of data in memory 1804 or storage 1806 for instructions executing at processor 1802 to operate on; the results of previous instructions executed at processor 1802 for access by subsequent instructions executing at processor 1802 or for writing to memory 1804 or storage 1806; or other suitable data. The data caches may speed up read or write operations by processor 1802. The TLBs may speed up virtual-address translation for processor 1802. In particular embodiments, processor 1802 may include one or more internal registers for data, instructions, or addresses. This disclosure contemplates processor 1802 including any suitable number of any suitable internal registers, where appropriate. Where appropriate, processor 1802 may include one or more arithmetic logic units (ALUs); be a multi-core processor; or include one or more processors 1802. Although this disclosure describes and illustrates a particular processor, this disclosure contemplates any suitable processor.

In particular embodiments, memory 1804 includes main memory for storing instructions for processor 1802 to execute or data for processor 1802 to operate on. As an example, and not by way of limitation, computer system 1800 may load instructions from storage 1806 or another source (such as, for example, another computer system 1800) to memory 1804. Processor 1802 may then load the instructions from memory 1804 to an internal register or internal cache. To execute the instructions, processor 1802 may retrieve the instructions from the internal register or internal cache and decode them. During or after execution of the instructions, processor 1802 may write one or more results (which may be intermediate or final results) to the internal register or internal cache. Processor 1802 may then write one or more of those results to memory 1804. In particular embodiments, processor 1802 executes only instructions in one or more internal registers or internal caches or in memory 1804 (as opposed to storage 1806 or elsewhere) and operates only on data in one or more internal registers or internal caches or in memory 1804 (as opposed to storage 1806 or elsewhere).

One or more memory buses (which may each include an address bus and a data bus) may couple processor 1802 to memory 1804. Bus 1812 may include one or more memory buses, as described below. In particular embodiments, one or more memory management units (MMUs) reside between processor 1802 and memory 1804 and facilitate accesses to memory 1804 requested by processor 1802. In particular embodiments, memory 1804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1804 may include one or more memory devices 1804, where appropriate. Although this disclosure describes and illustrates particular memory, this disclosure contemplates any suitable memory.

In particular embodiments, storage 1806 includes mass storage for data or instructions. As an example, and not by way of limitation, storage 1806 may include a hard disk drive (HDD), a floppy disk drive, flash memory, an optical drive, a magneto-optical disc, magnetic tape, or a Universal Serial Bus (USB) drive or a combination of two or more of these. Storage 1806 may include removable or non-removable (or fixed) media, where appropriate. Storage 1806 may be internal or external to computer system 1800, where appropriate. In particular embodiments, storage 1806 is non-volatile, solid-state memory. In particular embodiments, storage 1806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1806 taking any suitable physical form. Storage 1806 may include one or more storage control units facilitating communication between processor 1802 and storage 1806, where appropriate. Where appropriate, storage 1806 may include one or more storages 1806. Although this disclosure describes and illustrates particular storage, this disclosure contemplates any suitable storage.

In particular embodiments, I/O interface 1808 includes hardware, software, or both, providing one or more interfaces for communication between computer system 1800 and one or more I/O devices. Computer system 1800 may include one or more of these I/O devices, where appropriate. One or more of these I/O devices may enable communication between a person and computer system 1800. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1806 for them. Where appropriate, I/O interface 1808 may include one or more device or software drivers enabling processor 1802 to drive one or more of these I/O devices. I/O interface 1808 may include one or more I/O interfaces 1806, where appropriate. Although this disclosure describes and illustrates a particular I/O interface, this disclosure contemplates any suitable I/O interface.

In particular embodiments, communication interface 1810 includes hardware, software, or both providing one or more interfaces for communication (such as, for example, packet-based communication) between computer system 1800 and one or more other computer systems 1800 or one or more networks. As an example, and not by way of limitation, communication interface 1810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1810 for it.

As an example, and not by way of limitation, computer system 1800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1800 may include any suitable communication interface 1810 for any of these networks, where appropriate. Communication interface 1810 may include one or more communication interfaces 1810, where appropriate. Although this disclosure describes and illustrates a particular communication interface, this disclosure contemplates any suitable communication interface.

In particular embodiments, bus 1812 includes hardware, software, or both coupling components of computer system 1800 to each other. As an example, and not by way of limitation, bus 1812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1812 may include one or more buses 1812, where appropriate. Although this disclosure describes and illustrates a particular bus, this disclosure contemplates any suitable bus or interconnect.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Herein, "automatically" and its derivatives means "without human intervention," unless expressly indicated otherwise or indicated otherwise by context.

The embodiments disclosed herein are only examples, and the scope of this disclosure is not limited to them. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by an electronic device:
    emitting optical radiation to illuminate on one or more objects disposed inside an interior of the electronic device, wherein the optical radiation is emitted by one or more radiation sources;
    capturing a set of two-dimensional (2D) images of the one or more objects illuminated by the optical radiation, wherein variation of illumination or of an imaging process permits the set of 2D images to be combined into a representation of the one or more objects as imaged at multiple wavelengths;
    determining whether the set of images comprises a representation of the one or more objects as imaged at a sufficient number of wavelengths;
    in response to determining that the set of images comprises a representation of the one or more objects as imaged at a sufficient number of wavelengths, generating a three-dimensional (3D) spectral data cube representing images of the one or more objects in two spatial dimensions at multiple recorded wavelengths; and
    storing the 3D spectral data cube for processing by the electronic device.

2. The method of claim 1, wherein the optical radiation is emitted by a broadband radiation source disposed inside the interior of the electronic device;
    wherein each 2D image in the set of 2D images represents a linear cross-section within the field of view of an imaging device and wherein the second dimension of each 2D image depicts a variation of the linear-cross section across the multiple wavelengths; and
    an imaging process is varied to select particular linear cross-sections within a field of view of the imaging device.

3. The method of claim 1, wherein the optical radiation is emitted by one or more sources among a set of narrowband illumination sources disposed inside the interior of the electronic device; and
  wherein each 2D image in the set of 2D images is a 2D spatial view of the one or more objects imaged at a wavelength range corresponding to the optical radiation and wherein the optical radiation is varied to select particular wavelength ranges for sequential 2D images.

4. The method of claim 1, further comprising:
  retrieving the stored 3D spectral data cube of the one or more objects;
  determining one or more similarities between the 3D spectral data cube of the objects and one or more previously stored 3D spectral data cubes of one or more objects of one or more object types; and
  classifying one or more of the objects based on the determined similarities.

5. The method of claim 4, wherein classifying one or more of the objects based on the determined similarities comprises:
  calculating, for each of the one or more objects, a probability score the object is associated with a particular object type; and
  determining, for each of the one or more objects, whether the probability score associated with the object is greater than a threshold score;
  wherein each object having a probability score greater than the threshold score is classified as being of the respective particular object type.

6. The method of claim 5, further comprising:
  adding each object classified as being of the respective particular object type to an inventory of the one or more objects disposed inside the interior of the electronic device;
  generating a recommendation based on the inventory of the classified one or more objects disposed inside the interior of the electronic device; and
  sending the recommendation to a display of the electronic device.

7. The method of claim 1, further comprising:
  capturing a subsequent set of images of the one or more objects illuminated by spectral illumination; and
  determining a change in quality of one or more of the objects based on the subsequent set of images.

8. An electronic device comprising:
  one or more displays;
  one or more non-transitory computer-readable storage media including instructions; and
  one or more processors coupled to the storage media, the one or more processors configured to execute the instructions to:
    emit optical radiation to illuminate on one or more objects disposed inside an interior of the electronic device, wherein the optical radiation is emitted by one or more radiation sources;
    capture a set of two-dimensional (2D) images of the one or more objects illuminated by the optical radiation, wherein variation of illumination or of an imaging process permits the set of 2D images to be combined into a representation of the one or more objects as imaged at multiple wavelengths;
    determine whether the set of images comprises a representation of the one or more objects as imaged at a sufficient number of wavelengths;
    in response to determining that the set of images comprises a representation of the one or more objects as imaged at a sufficient number of wavelengths, generate a three-dimensional (3D) spectral data cube representing images of the one or more objects in two spatial dimensions at multiple recorded wavelengths; and
    storing the 3D spectral data cube for processing by the electronic device.

9. The electronic device of claim 8, wherein the optical radiation is emitted by a broadband radiation source disposed inside the interior of the electronic device;
  wherein each 2D image in the set of 2D images represents a linear cross-section within the field of view of an imaging device and wherein the second dimension of each 2D image depicts a variation of the linear-cross section across the multiple wavelengths; and
  an imaging process is varied to select particular linear cross-sections within a field of view of the imaging device.

10. The electronic device of claim 8, wherein the optical radiation is emitted by one or more sources among a set of narrowband illumination sources disposed inside the interior of the electronic device; and
  wherein each 2D image in the set of 2D images is a 2D spatial view of the one or more objects imaged at a wavelength range corresponding to the optical radiation and wherein the optical radiation is varied to select particular wavelength ranges for sequential 2D images.

11. The electronic device of claim 8, wherein the processors are further configured to execute the instructions to:
  retrieve the stored 3D spectral data cube of the one or more objects;
  determine one or more similarities between the 3D spectral data cube of the objects and one or more previously stored 3D spectral data cubs of one or more objects of one or more object types; and
  classify one or more of the first objects based on the determined similarities.

12. The electronic device of claim 11, wherein the instructions to classify one or more of the objects based on the determined similarities comprises instructions to:
  calculate, for each of the one or more objects, a probability score the object is associated with a particular object type; and
  determine, for each of the one or more objects, whether the probability score associated with the object is greater than a threshold score;
  wherein each object having a probability score greater than the threshold score is classified as being of the respective particular object type.

13. The electronic device of claim 12, wherein the processors are further configured to execute the instructions to:
  add each object classified as being of the respective particular object type to an inventory of the one or more objects disposed inside the interior of the electronic device;
  generate a recommendation based on the inventory of the classified one or more objects disposed inside the interior of the electronic device; and
  send the recommendation to a display of the electronic device.

14. The electronic device of claim 8, wherein the processors are further configured to execute the instructions to:
  capture a subsequent set of images of the one or more objects illuminated by spectral illumination; and
  determine a change in quality of one or more of the first objects based on the subsequent set of images.

15. A computer-readable non-transitory storage media comprising instructions executable by a processor to:
  emit optical radiation to illuminate on one or more objects disposed inside an interior of the electronic device, wherein the optical radiation is emitted by one or more radiation sources;
  capture a set of two-dimensional (2D) images of the one or more objects illuminated by the optical radiation, wherein variation of illumination or of an imaging process permits the set of 2D images to be combined into a representation of the one or more objects as imaged at multiple wavelengths;
  determine whether the set of images comprises a representation of the one or more objects as imaged at a sufficient number of wavelengths;
  in response to determining that the set of images comprises a representation of the one or more objects as imaged at sufficient number of wavelengths, generate a three-dimensional (3D) spectral data cube representing images of the one or more f objects in two spatial dimensions at multiple recorded wavelengths; and
  store the 3D spectral data cube for processing by the electronic device.

16. The media of claim 15, wherein the optical radiation is emitted by a broadband radiation source disposed inside the interior of the electronic device;
  wherein each 2D image in the set of 2D images represents a linear cross-section within the field of view of an imaging device and wherein the second dimension of each 2D image depicts a variation of the linear-cross section across the multiple wavelengths; and
  an imaging process is varied to select particular linear cross-sections within a field of view of the imaging device.

17. The media of claim 15, wherein the optical radiation is emitted by one or more sources among a set of narrow-band illumination sources disposed inside the interior of the electronic device; and
  wherein each 2D image in the set of 2D images is a 2D spatial view of the one or more objects imaged at a wavelength range corresponding to the optical radiation and wherein the optical radiation is varied to select particular wavelength ranges for sequential 2D images.

18. The media of claim 15, wherein the instructions are further executable by the processor to:
  retrieve the stored 3D spectral data cub e of the one or more objects;
  determine one or more similarities between the 3D spectral data cube of the objects and one or more previously stored 3D spectral data cubes of one or more objects of one or more object types; and
  classify one or more of the objects based on the determined similarities.

19. The media of claim 18, wherein the instructions to classify one or more of the objects based on the determined similarities comprises instructions to:
  calculate, for each of the one or more objects, a probability score the object is associated with a particular object type; and
  determine, for each of the one or more objects, whether the probability score associated with the object is greater than a threshold score;
  wherein each object having a probability score greater than the threshold score is classified as being of the respective particular object type.

20. The media of claim 19, wherein the instructions are further executable by the processor to:
  add each object classified as being of the respective particular object type to an inventory of the one or more objects disposed inside the interior of the electronic device;
  generate a recommendation based on the inventory of the classified one or more objects disposed inside the interior of the electronic device; and
  send the recommendation to a display of the electronic device.

* * * * *